United States Patent [19]
Mitsuda et al.

[11] Patent Number: 5,481,095
[45] Date of Patent: Jan. 2, 1996

[54] CODE READING PATTERN AND AN IMAGE PICKUP APPARATUS FOR READING THE PATTERN

[75] Inventors: Hiroshi Mitsuda; Masahiko Sakamoto; Hitoshi Tanaka; Nobuyuki Kosaka; Yoshinori Ito, all of Hyogo, Japan

[73] Assignee: Mitsubishi Denki Kabushiki Kaisha, Tokyo, Japan

[21] Appl. No.: 293,741

[22] Filed: Aug. 22, 1994

Related U.S. Application Data

[63] Continuation of Ser. No. 17,738, Feb. 16, 1993, abandoned.

[30] Foreign Application Priority Data

| Feb. 17, 1992 | [JP] | Japan | 4-029582 |
| Oct. 15, 1992 | [JP] | Japan | 4-276871 |
| Jan. 13, 1993 | [JP] | Japan | 5-019483 |

[51] Int. Cl.$^6$ ................................. G06K 7/10
[52] U.S. Cl. ...................... 235/454; 235/457; 235/494
[58] Field of Search .................... 235/454, 462, 235/467, 472, 457, 494; 250/237 G, 208.6; 359/2, 3, 17, 558, 562, 563, 566, 568, 572; 283/904, 91, 85, 86; 356/71

[56] References Cited

U.S. PATENT DOCUMENTS

| 3,572,900 | 3/1971 | Bouche | 350/162 SF |
| 4,501,439 | 2/1985 | Antes | 283/904 X |
| 4,511,616 | 4/1985 | Pitts et al. | 283/904 X |
| 4,568,141 | 2/1986 | Antes | 359/2 |
| 4,956,553 | 9/1990 | Matsui | 250/237 G |
| 4,984,824 | 1/1991 | Antes | 283/91 |
| 5,059,776 | 10/1991 | Antes | 235/457 |
| 5,073,710 | 12/1991 | Takagi et al. | 250/237 G |
| 5,101,184 | 3/1992 | Antes | 235/457 |
| 5,138,604 | 8/1992 | Umeda | 235/457 |
| 5,182,610 | 1/1993 | Shibata | 250/237 G |
| 5,251,937 | 10/1993 | Ojster | 283/91 |
| 5,291,006 | 3/1994 | Nishiguma et al. | 235/454 |

FOREIGN PATENT DOCUMENTS

| 2814890 | 12/1978 | Germany | 235/457 |
| 61-131438 | 6/1986 | Japan . | |
| 2-198128 | 8/1990 | Japan . | |

*Primary Examiner*—Donald T. Hajec
*Assistant Examiner*—Karl D. Frech
*Attorney, Agent, or Firm*—Wolf, Greenfield & Sacks

[57] ABSTRACT

A code reading pattern and an image pickup apparatus are provided for reading a symbol representing significant information, the symbol encoded by the pattern. The code reading pattern is formed by repeated markings of constant pitch on the surface of an object. The markings define area having at least one boundary, the at least one boundary defining an outline of the symbol. The apparatus includes a lighting system for illuminating the code reading pattern with parallel light, an imaging system for imaging light reflected from the pattern, a spatial frequency filtering system, located at the near back focal plane of the imaging system, for blocking regular reflected light and for transmiting diffracted light to project an image of the symbol, and a receiver for receiving the image.

18 Claims, 15 Drawing Sheets

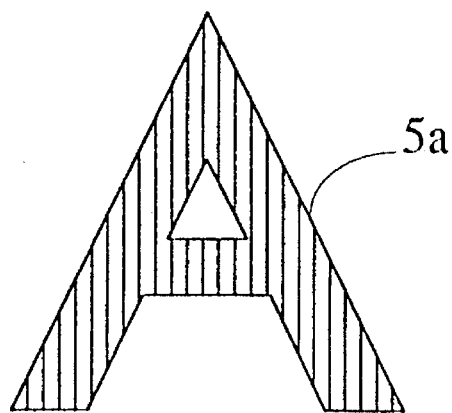
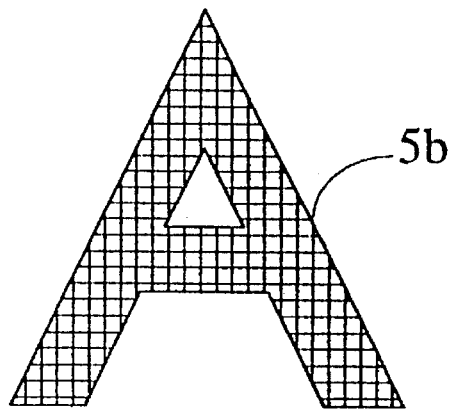
FIG. 1A  FIG. 1B
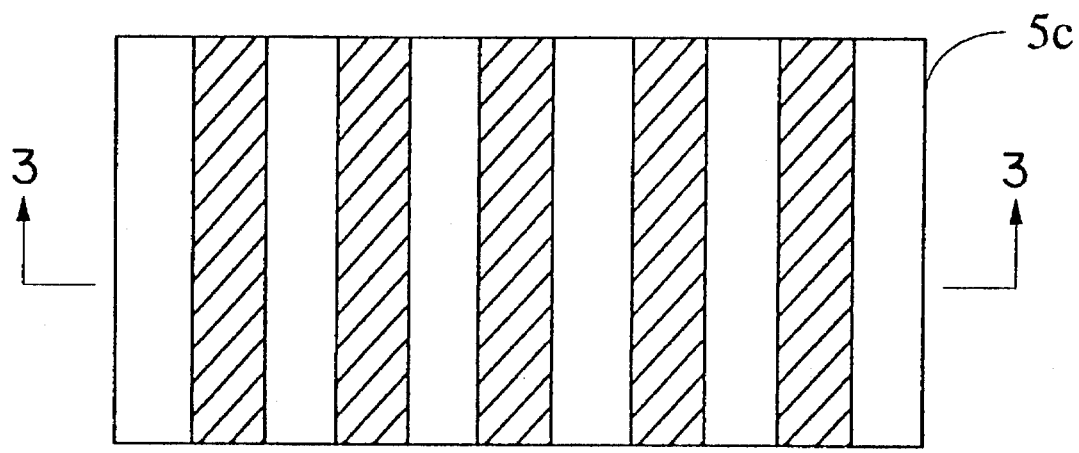
FIG. 2

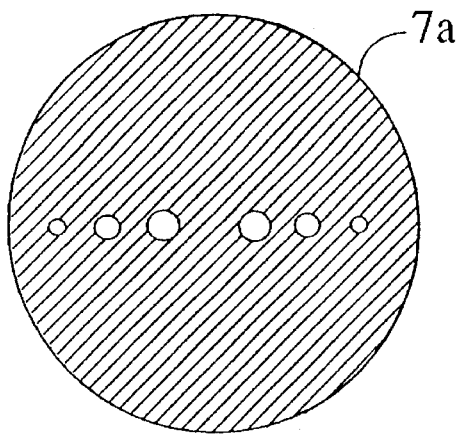
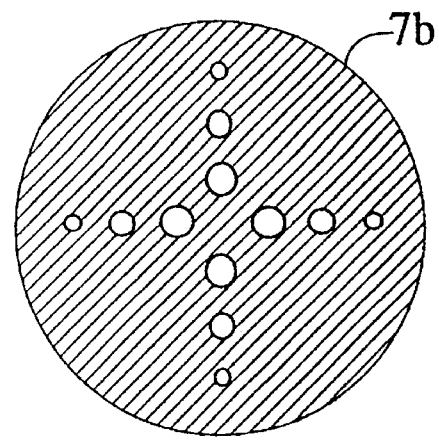
FIG. 8A　　　　　　　FIG. 8B
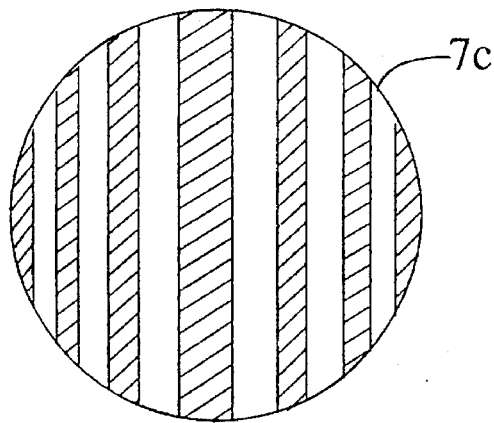
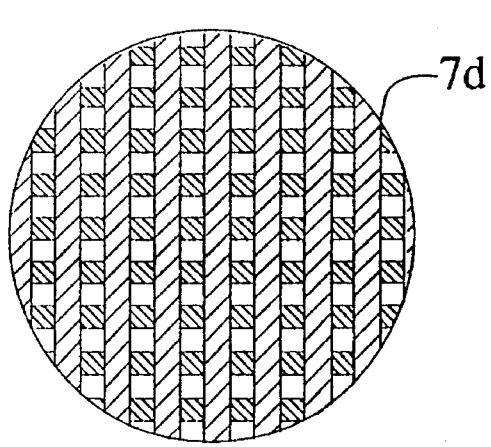
FIG. 8C　　　　　　　FIG. 8D
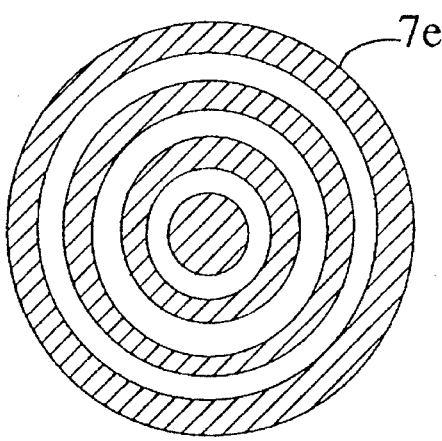
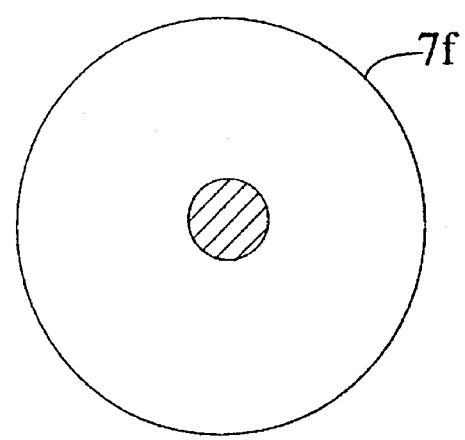
FIG. 8E　　　　　　　FIG. 8F

CODE READING PATTERN AND AN IMAGE PICKUP APPARATUS FOR READING THE PATTERN

This application is a file wrapper continuation of application Ser. No. 08/017,738, now abandoned filed Feb. 16, 1993.

BACKGROUND OF THE INVENTION

1. Field of the Invention

The invention relates to a code reading pattern and an image pickup apparatus for reading the pattern. The code reading pattern is formed on an object such as a semiconductor wafer in order to represent information.

2. Description of the Prior Art

FIG. 23 is block diagram of a conventional image pickup apparatus for a code reading pattern as shown, for example, Japanese laid-open patent publication No.2-198128. In the figure, the numeral 12 denotes a white light source, the numeral 13 a floodlight system, the numeral 14a, 14b, 14c an incident light, the numeral 15a a code section pattern, and the numeral 15b a base portion. The numeral 16b denotes the reflected light from the code section pattern 15a and the numeral 16a, 16c is the reflected light from the base portion 15b. The numeral 17 denotes an image lens, and the numeral 18 a light receiver.

The operation of the conventional system is explained below. The code reading pattern which represents the information of the object such as a semi-conductor wafer is formed by the material having a different reflectance from the base portion 15b, or formed by scraping the whole code uniformly. The code is illuminated obliquely by the white light source 12 and the floodlight system 13, and the image of the code is picked up by imaging the reflected light at the light receiver 18 such as a line sensor and a CCD camera through the image lens 17, as shown in FIG. 23. As described above, the code is picked up using the intensity difference between the reflected light 16b and the reflected lights 16a, 16c.

Since the conventional code reading pattern and the conventional image pickup apparatus for reading the code pattern are constructed as described above, the surface state such as the reflectance and the roughness of the base portion 15b change according to the respective production process or respective device. Therefore, there is a state where there is almost no intensity difference between the reflected light from the code section pattern 15a and base portion 15b. In this case, it is very difficult to recognize the code reading pattern because of difficulty for picking up the code at a stable picture quality. In that case, there is provided a method which carries out the marking process of the pattern for each production process in order to identify the pattern itself.

There is another method which provides a complex and large-scale image processing and a change of light angle in order to increase the ability of the pattern recognition at the image pickup apparatus side. But, in both cases there is a problem that the cost for reading the code becomes expensive.

BRIEF DESCRIPTION OF THE DRAWINGS

FIG. 1A is a top view which shows a code reading pattern of an embodiment of the present invention.

FIG. 1B is a top view which shows a code reading pattern of another embodiment of the present invention.

FIG. 2 is a top view which shows a code reading pattern of another embodiment of the present invention.

FIGS. 8A–8F each illustrate a type of spatial frequency filter which is placed at the near back focal plane of the image lens 6 in an embodiment of the present invention.

SUMMARY OF THE INVENTION

Figure 3:
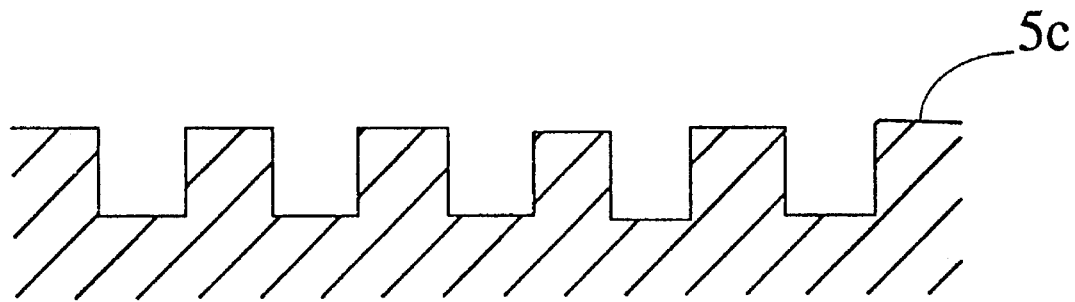
FIG. 3 is a cross sectional view of FIG. 2 along the line of 3—3.

It is an object of the present invention to provide a code reading pattern constituted by repeated shapes of constant pitch formed on the surface of an object in order to observe a diffracted light easily with high S/N ratio.

It is another object of the present invention to provide a code reading pattern constituted by repeated shapes of constant pitch formed on the surface of an object in order to observe a diffracted light easily with high S/N ratio, even if the films are piled on the code reading pattern.

It is another object of the present invention to provide a code reading pattern constituted by repeated shapes of a plurality of kinds of constant pitches formed on an area of the surface of an object in order to observe a plurality of kinds of diffracted light in one area.

It is another object of the present invention to provide a code reading pattern constituted by repeated shapes of a plurality of kinds of constant pitches formed on an area of the surface of an object in order to observe a plurality of kinds of diffracted light in one area if the code reading pattern is solid shape.

It is further another object of the present invention to provide an image pickup apparatus comprising a lighting means, a transmission means, a receiving means in order to obtain a clear pickup picture and improve reliability of code recognition.

It is further another object of the present invention to provide an image pickup apparatus in order to obtain a clear pickup picture and improve reliability of code recognition if the code reading pattern is solid shape.

It is further another object of the present invention to provide an image pickup apparatus in order to obtain a clear pickup picture and improve reliability of code recognition if the code reading pattern is constituted by the repeated shapes of a constant pitches on an area of the surface of an object.

It is further another object of the present invention to provide an image pickup apparatus in order to obtain a clear pickup picture and improve reliability of code recognition if the code reading pattern is constituted by the solid repeated shapes of a plurality of kinds of constant pitches on an area of the surface of an object.

It is further another object of the present invention to provide an image pickup apparatus in order to obtain a clear pickup picture by means of reducing intensity irregularity of the image and blur of the pattern image by occurrence of the interference fringe.

It is further another object of the present invention to provide an image pickup apparatus in order to obtain a clear pickup picture by means of reducing intensity irregularity of the image and blur of the pattern image by occurrence of the interference fringe if the code reading pattern is solid shape.

It is further another object of the present invention to provide an image pickup apparatus in order to receive only the diffracted light easily from the code reading pattern constituted by repeated shapes of constant pitch without disturbing the diffracted light.

It is further another object of the present invention to provide an image pickup apparatus in order to receive only the diffracted light easily from the code reading pattern constituted by repeated shapes of constant pitch without disturbing the diffracted light if the code reading pattern is solid shape.

An aspect of the present invention is to provide a code reading pattern used in a spatial frequency filtering system for picking up the pattern which comprises a pattern constituted by repeated shapes of constant pitch formed on the surface of an object.

Another aspect of the present invention is to provide a code reading pattern used in a spatial frequency filtering system for picking up the pattern which comprises a solid pattern constituted by repeated shapes of constant pitch formed on the surface of an object.

Another aspect of the present invention is to provide a code reading pattern used in a spatial frequency filtering system for picking up the pattern which comprises a pattern constituted by repeated shapes of a plurality of kinds of constant pitches formed on an area of the surface of an object.

Still another aspect of the present invention is to provide a code reading pattern used in a spatial frequency filtering system for picking up the pattern which comprises a solid pattern constituted by repeated shapes of a plurality of kinds of constant pitches formed on an area of the surface of an object.

Another aspect of the present invention is to provide an image pickup apparatus for reading a code reading pattern which comprises a lighting means for illuminating the code reading pattern constituted by the repeated shapes of constant pitch formed on the surface of an object by the parallel light; an image means for imaging light reflected from the code reading pattern which is illuminated by the lighting means; a transmission means using the spatial frequency filtering system for transmitting diffracted light from the code reading pattern which is illuminated by the lighting means, and for intercepting regular reflected light, at the near back focal plane of the image means; a receiving means for receiving the diffracted light which is transmitted through the transmission means.

Still another aspect of the present invention is to provide an image pickup apparatus for reading a code reading pattern which comprises a lighting means for illuminating a solid code reading pattern constituted by the repeated shapes of constant pitch formed on the surface of an object by the parallel light; an image means for imaging light reflected from the code reading pattern which is illuminated by the lighting means; a transmission means using the spatial frequency filtering system for transmitting diffracted light from the code reading pattern which is illuminated by the lighting means, and for intercepting regular reflected light, at the near back focal plane of the image means; a receiving means for receiving the diffracted light which is transmitted through the transmission means.

Another aspect of the present invention is to provide an image pickup apparatus for reading a code reading pattern which comprises a lighting means for illuminating the code reading pattern constituted by the repeated shapes of a plurality of kinds of constant pitches formed on an area of the surface of an object by the parallel light; an image means for imaging light reflected from the code reading pattern which is illuminated by the lighting means; a transmission means using the spatial frequency filtering system corresponding to the respective code reading pattern for transmitting diffracted light from the code reading pattern which is illuminated by the lighting means, and for intercepting regular reflected light, at the near back focal plane of the image means; a receiving means for receiving the diffracted light which is transmitted through the transmission means.

Still another aspect of the present invention is to provide a pattern which comprises a lighting means for illuminating a solid code reading pattern constituted by the repeated shapes of a plurality of kinds of constant pitches formed on an area of the surface of an object by the parallel light; an image means for imaging light reflected from the code reading pattern which is illuminated by the lighting means; a transmission means using the spatial frequency filtering system corresponding to the respective code reading pattern for transmitting diffracted light from the code reading pattern, which is illuminated by the lighting means, and for intercepting regular reflected light, at the near back focal plane of the image means; a receiving means for receiving the diffracted light which is transmitted through the transmission means.

Another aspect of the present invention is to provide an image pickup apparatus for reading a code reading pattern which comprises a lighting means for illuminating the code reading pattern constituted by the repeated shapes of constant pitch formed on the surface of an object by the parallel light; an image lens arranged vertically or near vertically along an optical path or near the optical path so that a plus nth order or a minus nth order diffracted light (n=1, 2, 3, ...) comes in from the illuminated code reading pattern; a transmission means using the spatial frequency filtering system for transmitting diffracted light from the code reading pattern illuminated by the lighting means, whereby the diffracted light comes vertically or near vertically into the center portion or near the center portion of the image lens, and for intercepting regular reflected light, at the near back focal plane of the image means; a receiving means for receiving the diffracted light which is transmitted through the transmission means.

Still another aspect of the present invention is to provide an image pickup apparatus for reading a code reading pattern which comprises a lighting means for illuminating a solid code reading pattern constituted by the repeated shapes of constant pitch formed on the surface of an object by the parallel light; an image lens arranged vertically or near vertically along an optical path or near the optical path so that a plus nth order or a minus nth order diffracted light (n=1, 2, 3, ...) comes in from the illuminated code reading pattern; a transmission means for transmitting diffracted light from the code reading pattern illuminated by the lighting means in the spatial frequency filtering system, whereby the diffracted light comes vertically or near vertically into the center portion or near the center portion of the image lens, and for intercepting regular reflected light, at the near back focal plane of the image means; a receiving means for receiving the diffracted light which is transmitted through the transmission means.

Still another aspect of the present invention is to provide an image pickup apparatus for reading a code reading pattern which comprises a lighting means for illuminating the code reading pattern constituted by the repeated shapes of constant pitch formed on the surface of an object by the parallel light; an image means for imaging light reflected from the code reading pattern which is illuminated by the lighting means; a spatial frequency filter equipped with an aperture at the distance of $n \times \lambda \times f/p$ (n=1, 2, 3, ...) away from the center of the light axis, where the wave length of laser light is $\lambda$, the constant pitch width of the code reading pattern is p, the focal distance of the image lens is f, for transmitting diffracted light through the aperture from the code reading pattern illuminated by the lighting means, and for intercepting regular reflected light, at the near back focal plane of the image means; a receiving means for receiving the diffracted light which is transmitted through the transmission means.

Another aspect of the present invention is to provide an image pickup apparatus for reading a code reading pattern which comprises a lighting means for illuminating a solid code reading pattern constituted by the repeated shapes of constant pitch formed on the surface of an object by the parallel light; an image means for imaging light reflected from the code reading pattern which is illuminated by the lighting means; a spatial frequency filter equipped with an aperture at the distance of $n \times \lambda \times f/p$ (n=1, 2, 3, ...) away from the center of the light axis, where the wave length of laser light is $\lambda$, the constant pitch width of the code reading pattern is p, the focal distance of the image lens is f, for transmitting diffracted light through the aperture from the code reading pattern illuminated by the lighting means, and for intercepting regular reflected light, at the near back focal plane of the image means; a receiving means for receiving the diffracted light which is transmitted through the transmission means.

DETAILED DESCRIPTION OF THE PREFERRED EMBODIMENTS

Embodiment 1

FIG. 1 is a top view which shows a code reading pattern of a first embodiment of the present invention. The numeral 5a in FIG. 1A denotes a code reading pattern having longitudinal stripes in the code area (character A) on the object surface.

In the pattern, each stripe is formed by repeated lines having constant pitch. The numeral 5b in FIG. 1B denotes a code reading pattern having a grid of stripes in the code area (character A) on the object surface. In the pattern, each stripe is formed by repeated longitudinal and traverse lines having constant pitch. The code reading patterns 5a, 5b in FIG. 1 are formed in the code portion in the predetermined code writing area by the repeated stripes having constant pitch. But the stripes are not formed in the background portion.

The code reading pattern of the invention is a pattern which is picked up by the spatial frequency filtering system which images the code using the diffracted light under the condition of shielding the regular reflected light.

According to the present invention, there are many members such as a semi-conductor wafer, a glass substrate, an optical disc, printed wiring board, a body of a car, a bottle, a glass board, a plastic board, a metal board, a metal formation thing as an object on which the code reading pattern is formed.

The operation of the first embodiment of the present invention is explained below. In the semi-conductor wafer process, for example, the code reading pattern is formed at the initial production process on the wafer surface. In that case, a pattern having repetition shapes having constant pitch may be written on the predetermined area where the character or the code is written by an equipment such as a laser writer.

The code reading patterns 5a, 5b are formed on the surface of the object so that they can be picked up with high S/N ratio. That is, in the pickup image in the spatial frequency filtering system, since the regular reflected light includes the reflected light from the pattern of repetition shape having constant pitch and the reflected light from the other part such as background portion, both components of reflected light shine if the regular reflected light is used for picking up the image. Therefore, it is difficult to observe a code with high S/N ratio.

Regarding the reflected light reflected from the code reading pattern of the present invention, since only the diffracted light is used for picking up the code, only a pattern of repetition shape having constant pitch scraping for observing the code with high S/N ratio.

In FIG. 1, regarding the repetition shape having constant pitch, the code reading pattern 5a is formed so that the stripe is arranged toward one direction and the code reading pattern 5b is formed so that the grid is arranged toward two directions. Further, the code reading pattern 5b may be formed so that the grid is arranged toward more than three directions or the grid is arranged by dots.

Embodiment 2

FIG. 2 is a top view which shows marking having indentation on the surface of a part of the code reading pattern of an embodiment of the present invention. FIG. 3 is a cross sectional view of FIG. 2 along the line of 3—3.

In FIG. 2 and FIG. 3, a marking 5c is a marking which is arranged by an uneven indentation having longitudinal strip shape on the object, the marking is also formed by the indentation having repetition shape of constant pitch. The marking 5c in FIG. 2 is also formed in the code portion in the predetermined code writing area by the the indentation having repeated shape of constant pitch. But the indentation, having stripe shape are not formed in the background portion.

The operation of the second embodiment of the present invention is explained below. In the second embodiment, as same as that of the first embodiment, in the semi-conductor wafer process, for example, the code reading pattern is formed at the initial production process on the wafer surface. In that case, a pattern having repetition shapes of constant pitch may be written three dimensionally on the predetermined whole area by marking having indentation where the character or the code is written by equipment such as a laser writer, and the character or the code may be written by destroying the pattern in the form of it. The code reading pattern also may be formed on the object by etching after exposing using the exposure equipment and developing.

The cross-sectional view of marking 5c having indentation on the surface shown in FIG. 2 denotes a rectangular shape. But it may be a sine wave sectional shape if the indentation having stripe shape is formed by the repetition shape having constant pitch. It may be also a triangle shape.

Embodiment 3

Figure 4:
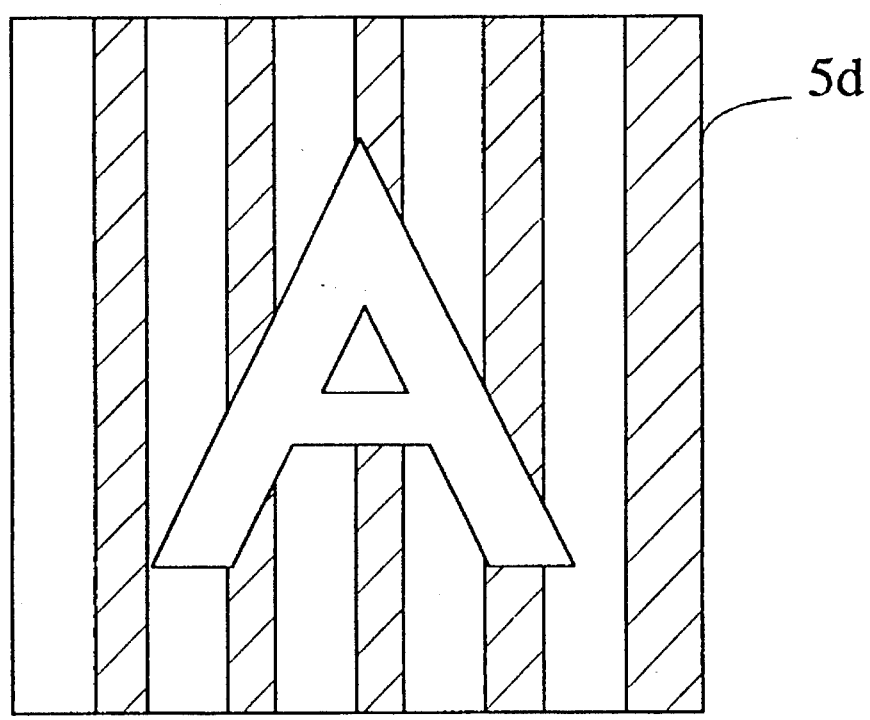
FIG. 4 is another top view which shows a code reading pattern of another embodiments of the present invention.

FIG. 4 is another top view which shows a code reading pattern of the other embodiments of the present invention. In the figure, the numeral 5d denotes a code reading pattern. In the code reading pattern 5d, the stripes are formed by the repetition shape having constant pitch in the background portion where the code portion is removed, but not formed in the code portion in the predetermined code writing area. It is also possible to apply a plane shape or a three-dimensional shape to the code reading pattern 5d.

The operation of the third embodiment of the present invention is explained below. In the third embodiment, as same as that of the first embodiment, the code reading pattern is formed at the background portion of the character or the code of the repetition shape having constant pitch.

Embodiment 4

Figure 5:
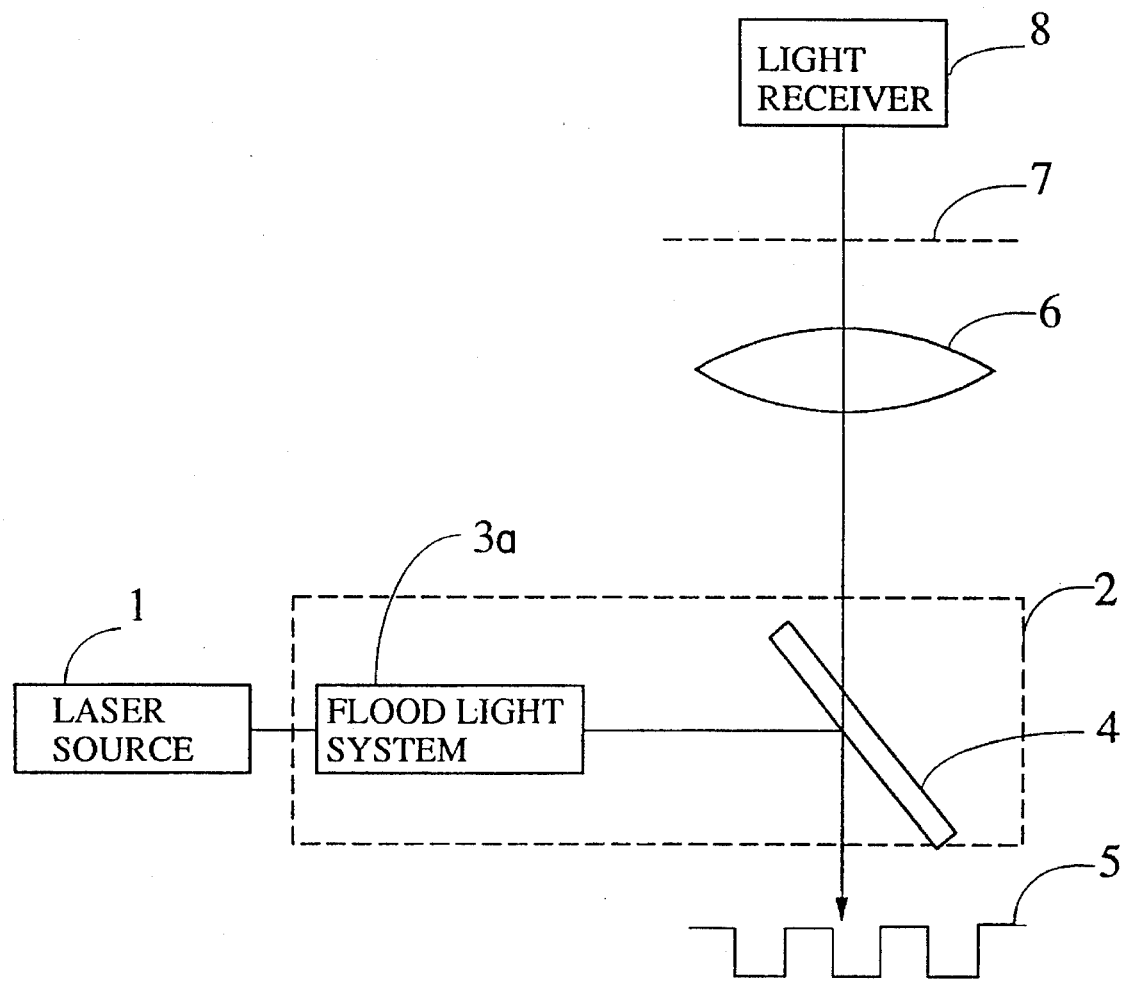
FIG. 5 is a block diagram which shows an image pickup apparatus of an embodiment of the present invention.

FIG. 5 is a block diagram which shows an image pickup apparatus of other embodiments of the present invention. In FIG. 5, the numeral 1 denotes a laser source, the numeral 2 a lighting optical system, the numeral 3a a floodlight lens system, the numeral 4 a half mirror, the numeral 5 a code reading pattern, the numeral 6 an image lens, the numeral 7 a spatial frequency filter which is placed near the back focal plane (it is referred below to as "at the back of the focal surface") of the image lens 6, the numeral 8 a image sensor.

Figure 6:
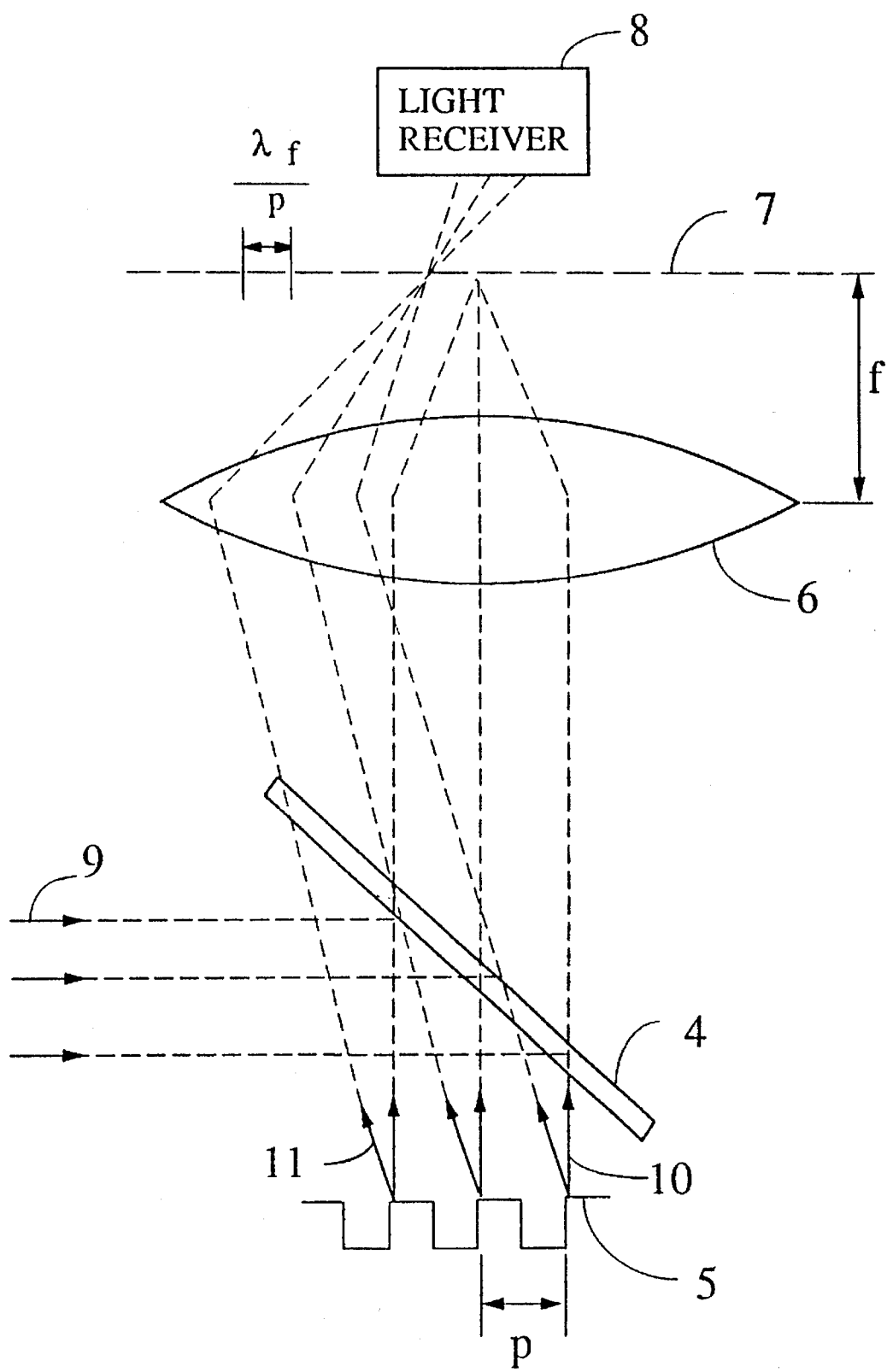
FIG. 6 is a description figure which shows a principle of an image pickup apparatus of FIG. 5.

FIG. 6 is a description figure which shows a principle of an image pickup apparatus of FIG. 5. In the FIG. 6, the numeral 9 denotes a parallel light obtained by the laser source 1 and the floodlight lens system 3a, the numeral 4 a half mirror, the numeral 5 a code reading pattern, the numeral 10 regular reflected light reflected from the code reading pattern 5, the numeral 11 diffracted light reflected from the code reading pattern 5, the numeral 6 an image lens, the numeral 7 a spatial frequency filter, the numeral 8 a image sensor.

FIG. 7 is a figure which explains diffraction patterns of the reflected light received from the code reading pattern 5 which appear at the back focal plane of the image lens 6 in the fourth embodiment. FIG. 8 is a figure which explains spatial frequency filters which are placed at the back focal plane of the image lens 6 in the fourth embodiment. In FIG. 8, the numerals 7a, 7b, 7c, 7d, 7e, 7f denote spatial frequency filters which are used for various purposes of the spatial frequency filter.

The operation of the fourth embodiment of the present invention is explained below. In the image pickup apparatus of the fourth embodiment in FIG. 5, the laser light is generated in the laser source 1. The laser light is converted to a parallel light by the floodlight lens system 3a in the lighting optical system 2 and the parallel light illuminates the code reading pattern 5 vertically using the half mirror 4.

The reflected light reflected from the code reading pattern 5 is filtered by the spatial frequency filter 7 and the regular reflected light having strong light intensity and the scattered light which is an origin of the noise is intercepted and only the diffracted light is transmitted. An image of the codes is formed by the diffracted light and picked up by the image sensor 8.

According to the principle of the pickup image shown in FIG. 6, the laser light generated in the laser source 1 is converted to a parallel light 9 by the floodlight lens system 3a and the parallel light illuminates the code reading pattern 5 vertically using the half mirror 4. A regular reflected light 10 having strong light intensity, a diffracted light 11 and a scattered light are reflected from the code reading pattern 5 formed of the repetition shape having a constant pitch. These reflected lights are imaged by the image lens 6.

Let's assume that the wave length of laser light is $\lambda$, the focal distance of the image lens 6 is f, the constant pitch width of the code reading pattern 5 is p and $\lambda \ll p$. Then, the regular reflected light pattern having strong light intensity and the diffraction pattern of the diffracted light 11 appear toward the repetition direction of the code reading pattern 5 by the rate of $\lambda \times f/p$ at the back focal plane of the image lens 6.

Figure 7A:
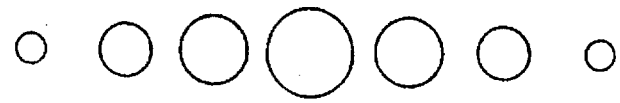
FIG. 7A is a figure which explains diffraction patterns of the reflected light received from the code reading pattern 5 which appear at the near back focal plane of the image lens 6 in an embodiment corresponding to FIG. 1A of the present invention.
Figure 7B:
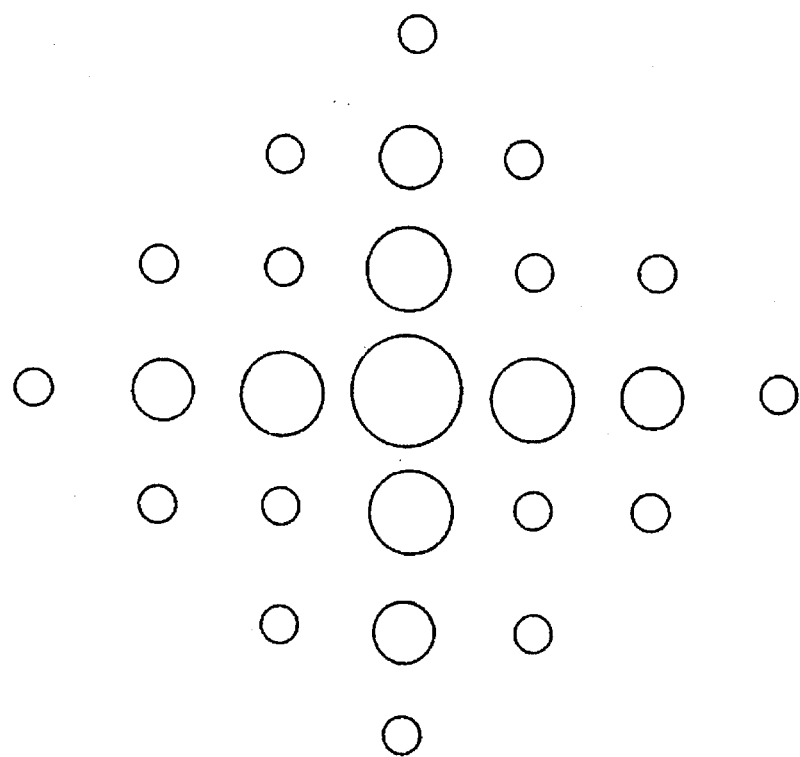
FIG. 7B is a figure which explains diffraction patterns of the reflected light received from the code reading pattern 5 which appear at the near back focal plane of the image lens 6 in an embodiment corresponding to FIG. 1B of the present invention.

The diffraction patterns are shown concretely in FIG. 7A, FIG. 7B. Each center circle denotes the regular reflected light 10 and other circles denote the diffraction pattern of the diffracted light 11.

When the code is constituted by the repetition pattern of line and space toward one direction as shown in FIG. 1A, the diffraction pattern appears as shown in FIG. 7A. When the code is constituted by the repetition pattern of the grid as shown in FIG. 1B, the diffraction pattern appears as shown in FIG. 7B.

In FIG. 6, the spatial frequency filter 7 is placed at the focal plane of the image lens 6 so as to transmit only the diffracted light 11.

When the code is constituted by repetition patterns toward one direction as shown in FIG. 1A, a spatial frequency filter 7a shown in FIG. 8A is suitable which intercepts the regular reflected light 10 and transmits only the diffracted light 11. A filter 7c which is constituted by the line and space representing the interception portion and the transmission portion, respectively, as shown in FIG. 8C, may be also suitable for transmitting only the diffracted light 11 in accordance with the diffraction pattern shown in FIG. 7A.

When the code is constituted by repetition grid patterns as shown in FIG. 1B, a spatial frequency filter 7b shown in FIG. 8B is suitable for transmitting only the diffracted light 11 in accordance with the diffraction pattern shown in FIG. 7B.

A filter 7d which is constituted by the grid having transmitting portion and intercepting portion, as shown in FIG. 8D, may be also suitable for transmitting only the diffracted light 11 in accordance with the diffraction pattern shown in FIG. 7B.

When the code is constituted by repetition patterns toward many directions or repetition patterns of dots shape, a spatial frequency filter 7a or 7b is also suitable for transmitting only the diffracted light 11 in accordance with the diffraction pattern, as same as the filter of FIG. 8A and FIG. 8B.

A filter 7e which is constituted by the center interception portion which intercepts the regular reflected light 10 and repetition concentric circles representing interception portions and transmission portions, respectively, as shown in FIG. 8E, may be also suitable for transmitting only the diffracted light 11 in accordance with the diffraction pattern. The regular reflected light 10 having a strong light intensity and scattered light which is the origin of the noise are suppressed by the spatial frequency filter 7e.

If influence of the scattered light is within the allowable limit, a filter 7f of FIG. 8F may be also used.

The image of the code as formed by the diffracted light 11 is picked up at the image sensor 8 through the spatial frequency filter 7f. The transmission portion of the filter may be opened, or it may be constituted by materials such as glass, acryl, vinyl and plastic which transmits light through them.

Figure 9:
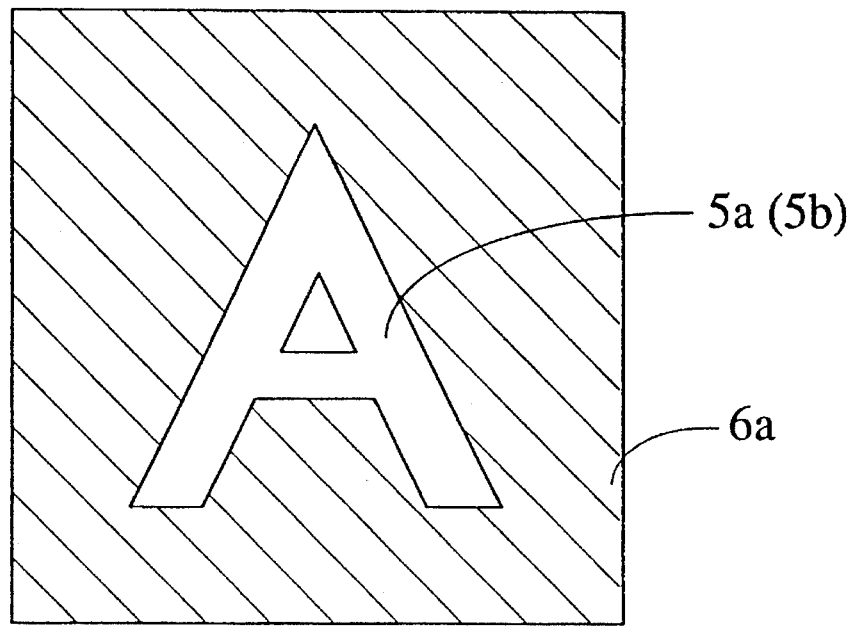
FIG. 9 is an example of the image which the image pickup apparatus of FIG. 5 picks up from the code reading pattern of FIG. 1.

The result of the pickup image is explained below. FIG. 9 is an example of an image which the image pickup apparatus of FIG. 5 picks up of the code reading pattern of FIG. 1. In FIG. 9, the numeral 6a denotes a background portion.

According FIG. 9, since the code reading pattern 5a or 5b is constituted by the repetition shape having constant pitch in the code portion, the code portion 5a is picked up as bright portion and the background portion 6a as dark portion. Therefore, the code reading pattern can be input as a clear image because of the clear distinction of the bright and dark.

Regarding the code reading pattern 5c shown in FIG. 2, the similar pickup image result can be obtained, if the repetition shape of the code reading pattern 5a, 5b is a solid shape, as same as the result of FIG. 9.

Figure 10:
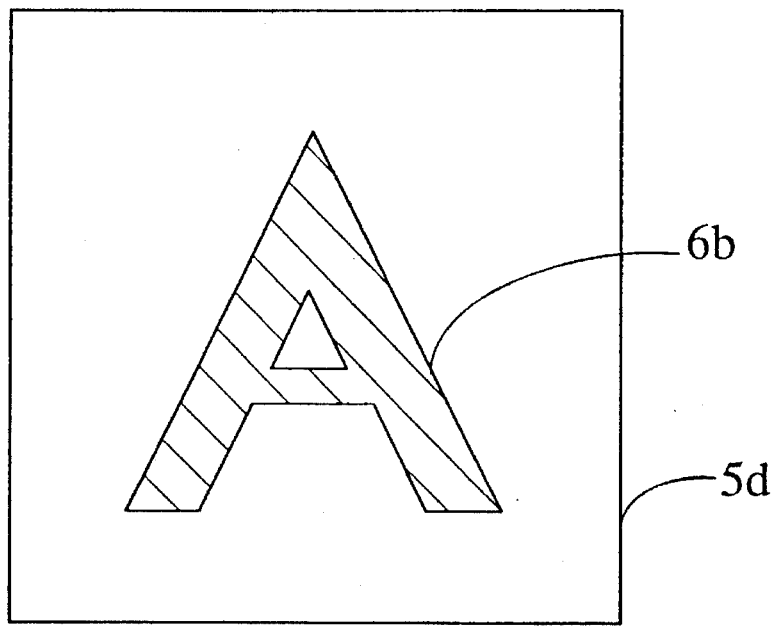
FIG. 10 is another example of the image which the image pickup apparatus of FIG. 5 picks up from of the code reading pattern of FIG. 4.

FIG. 10 is another example of image in which the image pickup apparatus of FIG. 5 picks up the code reading pattern of FIG. 4. In FIG. 10, the numeral 6b denotes a code portion.

According FIG. 10, since the code reading pattern 5d is constituted by the repetition shape having constant pitch in the background portion, the code portion 6b is picked up as a dark portion and the background portion 5d as a bright portion. Therefore, the code reading pattern can be input as a clear image because of the clear distinction of the bright and dark. A similar pickup image result can be obtained in the same way as shown above, if the repetition shape of the code reading pattern 5d is a solid shape.

As shown in the above, in the fourth embodiment, the pickup image can be carried out in the same way whether of a plane or a solid code reading pattern. By means of carrying out spatial frequency filtering in order to pick up the code using the spatial frequency filter, it becomes easy to observe the diffracted light from the code reading pattern and to obtain a clear image, because the spatial frequency filter intercepts the regular reflected light having strong light intensity and the scattered light which is the origin of the noise and receives an image of the symbol formed by the transmitted diffracted light at the image sensor.

Since the code reading pattern mentioned above is constituted by the repetition solid shape having constant pitch, there remains a repetition shape having constant pitch if films and so on are piled on the code reading pattern.

Therefore, diffracted light from the code reading pattern can be observed and a clear image is obtained, because the spatial frequency filter intercepts the regular reflected light having strong light intensity and the scattered light which is the origin of the noise and receives an image of the symbol formed by the transmitted diffracted light at the image sensor.

Further, by causing the code portion or the background portion to repetition shape of plane or solid having constant pitch, the clear image can be obtained in bright at the code portion and in dark at the background portion or in dark at the code portion and in bright at the background portion.

Especially when the background portion of the code is formed by the repetition shape having constant pitch as the above code reading pattern, a code may be formed only by breaking out the repetition shape having constant pitch by heat transformation using a laser writer, by mechanically scraping or embedding, or chemically processing.

And also the area for forming the code reading pattern of repetition shape having constant pitch may be the same in spite of the kind of the object and the code. Accordingly, the operation for forming a code reading pattern can be unified.

The system is comprised of the lighting optical system for illuminating the code reading pattern by parallel laser light, the optical lens for imaging the reflected light received from the above code reading pattern, the spatial frequency filter which is placed at the back of the focal plane of the lens for removing the reflected light except the diffracted light received from the code reading pattern, and the image sensor which is placed at the image position of the above lens for receiving an image of the symbol formed by the diffracted light which transmits through the above spatial frequency filter. A clear image can be obtained even if the surface state changes and reliability of the code recognition improves. Because of the reduction for noise measure in the image processing, both the H/W (Hardware), S/W (Software) can be simplified. And, because of a few pre-treatment, high speed of process can be attained. And also a cheap recognition system can be obtained.

Embodiment 5

Figure 11A:
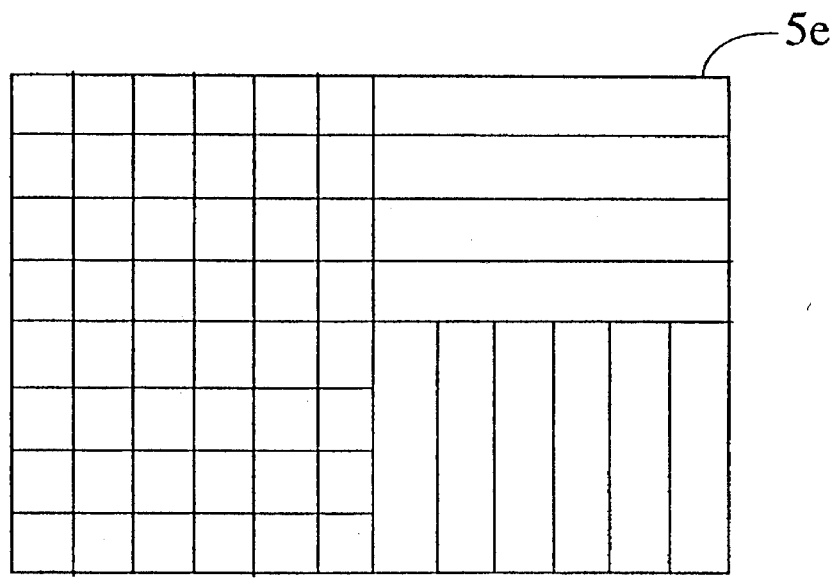
FIGS. 11A and 11B are top views which show code reading patterns of other embodiment of the present invention.
Figure 11B:
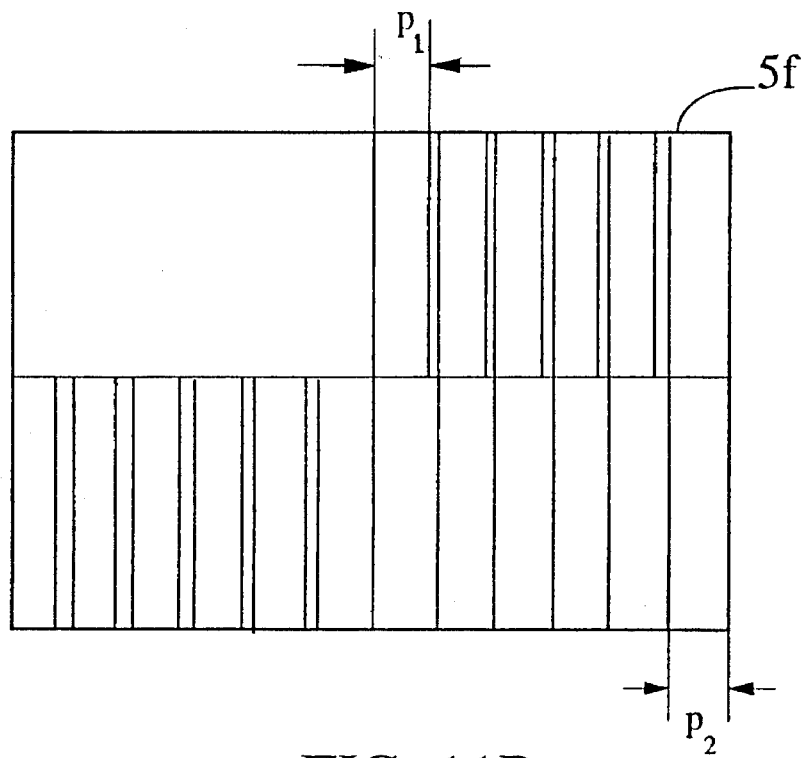

FIG. 11 is top views which show code reading patterns of other embodiments of the present invention. In the figure, the numeral 5e shown in FIG. 11A and 5f shown in FIG. 11B are code reading patterns, respectively. The code represented by the code reading pattern 5e of FIG. 11A, 5f of FIG. 11B are divided by four partitions of a predetermined size and are constituted by the combination of brightness or darkness of each partition. In the two embodiments, as shown in FIG. 11, a plurality of kind of repetition shape having constant pitch is formed in one area in each code. In FIG. 11A, two kinds of line and space having different direction are formed in one area, concretely, two kinds of longitudinal and traverse stripes are used.

On the other hand, in FIG. 11B, two kinds of line and space of the same direction having different pitch $p_1$ and $p_2$ ($p_1 \neq p_2$) are formed in one area. In the code reading pattern 5e, 5f of the fifth embodiment, any plane or solid shape can be used.

The operation of the fifth embodiment of the present invention is explained below. FIG. 12 is figures which show diffracted light patterns from the code reading pattern of the fitted embodiment. FIG. 13 are examples of image which the image pickup apparatus of the present invention pick up the code reading pattern of the fifth embodiment. FIG. 14 are other examples of images in which the image pickup apparatus of the present invention picks up the code reading pattern of the fifth embodiment.

The image pickup apparatus and the image pickup method can be applied to another embodiment as same as that of the above fourth embodiment.

When the code reading patterns 5e or 5f shown in FIG. 11 is illuminated by the parallel laser light and its reflected light is converged by the image lens, a diffraction pattern appears at the back focal plane of the image lens.

Let's assume that the wave length of parallel laser light is $\lambda$, the focal distance of the image lens 6 is f, the constant pitch width of the code reading pattern 5 is p, then, the diffraction pattern appears toward the repetition direction of the code reading pattern by the rate of $\lambda \times f/p$.

Figure 12A:
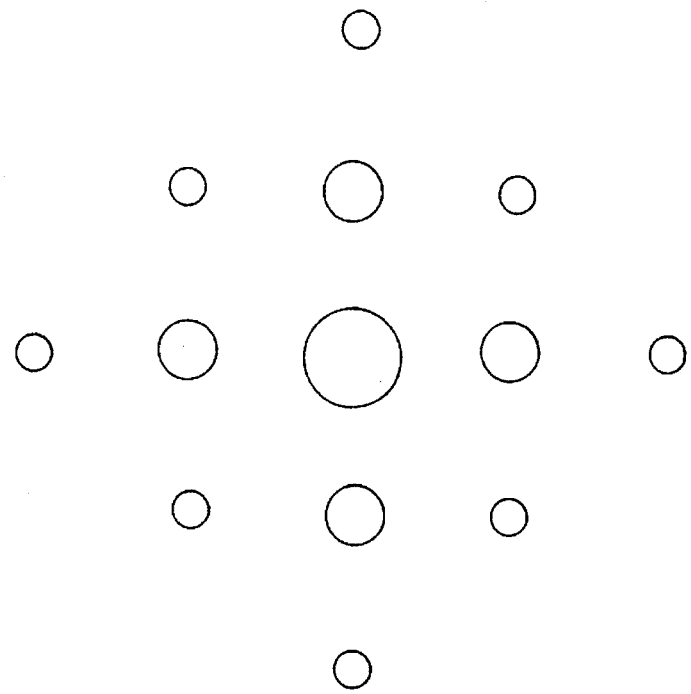
FIGS. 12A and 12B are plan views of diffracted light patterns from the code reading pattern of other embodiments.
Figure 12B:
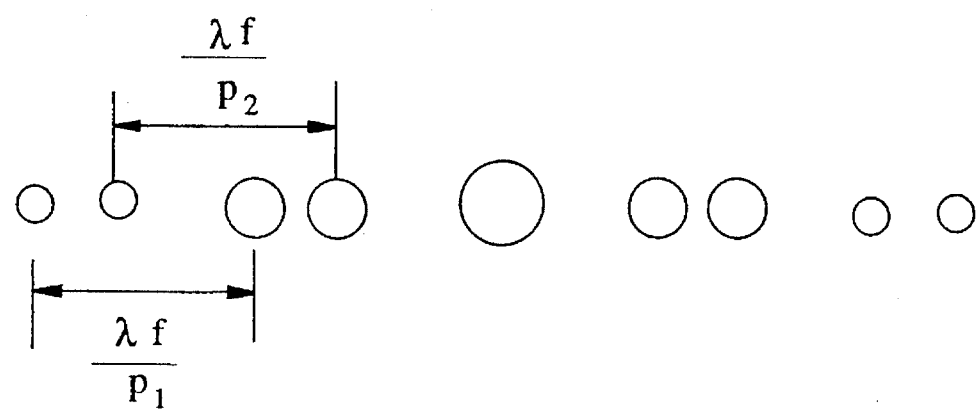

As shown in FIGS. 12A, 12B, two kinds of the diffraction patterns appear by the repetition patterns in response to FIGS. 11A, 12B. By selecting a desired diffraction pattern through the same spatial frequency filters 7 (7a~7f) as those in the first embodiment, various kinds of images shown in FIG. 13 or FIG. 14 are obtained.

Figure 13A:
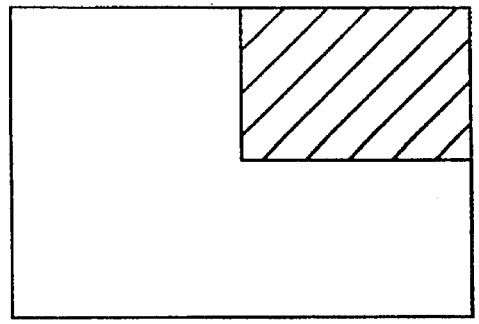
FIGS. 13A and 13B are examples of the image which the image pickup apparatus of the present invention picks up from the code reading pattern of an embodiment illustrated in FIG. 11A.
Figure 13B:
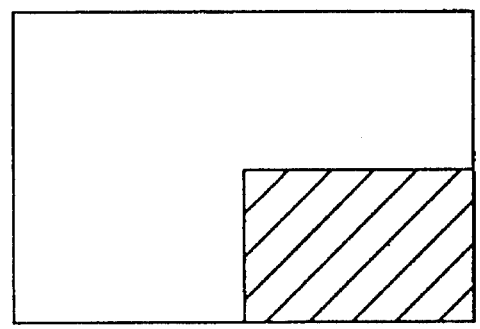

FIG. 13A is a pickup picture which is imaged by the diffracted light reflected only from the longitudinal line and space of the code reading pattern 5e of FIG. 11A through the spatial frequency filter 7. FIG. 13B is a pickup picture which is imaged by the diffracted light reflected only from the traverse line and space of the code reading pattern 5e of FIG. 11A through the spatial frequency filter 7.

Figure 14A:
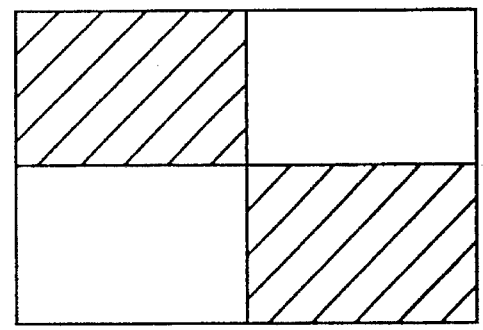
FIGS. 14 A & B are other examples of the image which the image pickup apparatus of the present invention picks up from the code reading pattern of an embodiment illustrated in FIG. 11B.
Figure 14B:
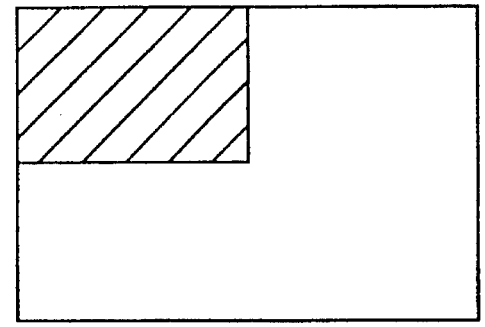

FIG. 14A is a pickup picture which is imaged by the diffracted light reflected only from the line and space having the pitch of $p_1$ of the code reading pattern 5f of FIG. 11B through the spatial frequency filter 7. FIG. 14A is a pickup picture which is imaged by the diffracted light reflected only from the line and space having the pitch of $p_2$ of the code reading pattern 5f of FIG. 11B through the spatial frequency filter 7.

The above repetition shape having constant pitch is constituted by the line and space, but it may be constituted by other shape such as dot.

According to the fifth embodiment as shown above, when several kinds of repetition shapes having constant pitch are constituted in one area as the above mentioned code reading pattern, a plurality of diffraction patterns appear. If each diffracted light is received after filtering through the spatial frequency filter corresponding to each diffracted light, each code is picked up independently of each other. According to the present embodiment, since a plurality of images are obtained according to combinations of bright portion and dark portion, recording density of information on the object becomes large.

Embodiment 6

Figure 15:
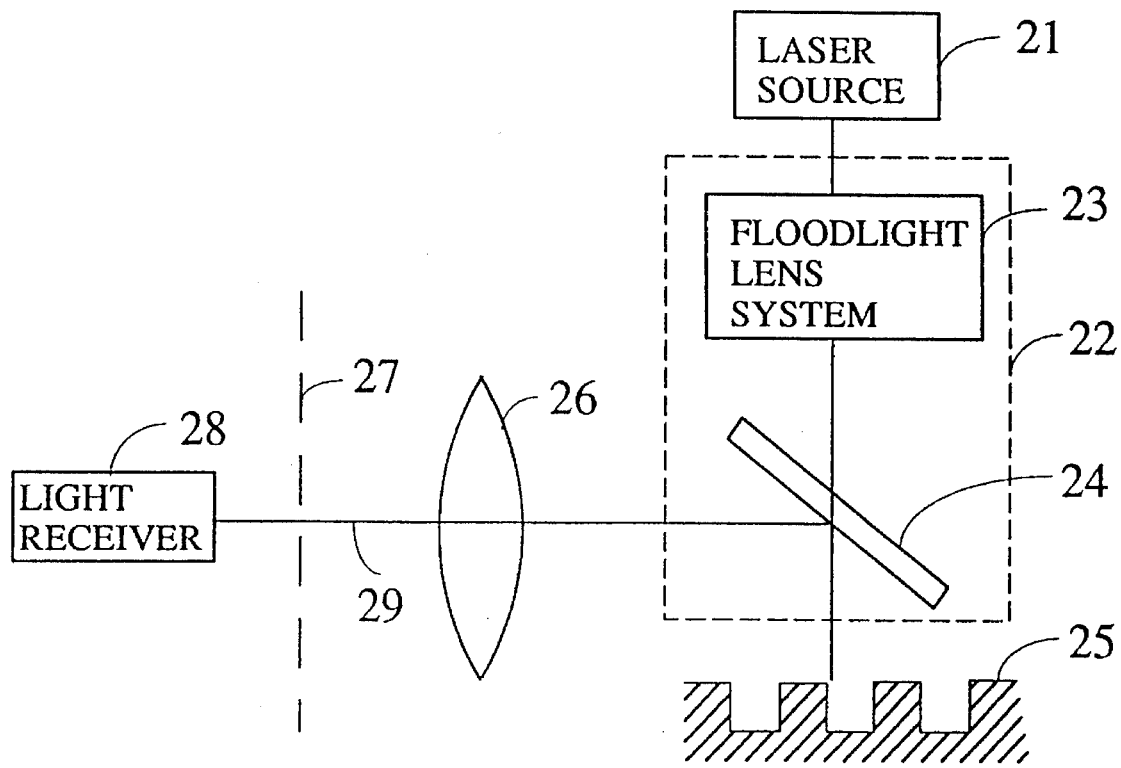
FIG. 15 is another block diagram which shows an image pickup apparatus of other embodiments of the present invention.

FIG. 15 is another block diagram which shows an image pickup apparatus of other embodiments of the present invention. In FIG. 15, the numeral 21 denotes a laser light source, the numeral 22 a lighting optical system, the numeral 23 a floodlight lens system, the numeral 24 a half mirror, the numeral 25 a code reading pattern, the numeral 26 an image lens, the numeral 27 a spatial frequency filter which is placed at the back focal plane of the image lens 26, the numeral 28 a image sensor.

The operation of the sixth embodiment of the present invention is explained below. In the image pickup apparatus shown in FIG. 15, the lighting optical system except the half mirror 4 in the image pickup apparatus (FIG. 5) in the above fourth embodiment is interchanged with the image sensing means including the image lens 6, the spatial frequency filter and the image sensor. As a result, the parallel incident light transmits half mirror 24, the regular reflected light from the code reading pattern 25 (corresponding the regular reflected light 10 in FIG. 6) and the diffracted light (corresponding the diffracted light 10 in FIG. 6) reflect by the half mirror 24 and image on the focal plane by the image lens 26.

The spatial frequency filter 27 which is placed at the back of the focal plane of image lens 26 suppresses the regular reflected light having strong light intensity and scattered light which is the origin of the noise and transmits only the diffracted light. The diffracted light transmitted through the spatial frequency filter 27 forms an image of the symbol which is received by the image sensor 28 in order to make the pickup picture.

Embodiment 7

In the lighting optical system in the above fourth and sixth embodiment, the code reading pattern is illuminated from the vertical direction, but it may be illuminated from the oblique direction. In the latter case, the receiving means is placed on the reflection light axis. The spatial frequency filter of the above embodiment may transmit one or more diffracted lights. And also, in the above embodiment, one or more diffracted lights may be used.

Embodiment 8

Figure 16A:
FIGS. 16A and 16B are other image patterns of diffracted light or scattered light by other embodiments and the conventional image pickup apparatus.
Figure 16B:
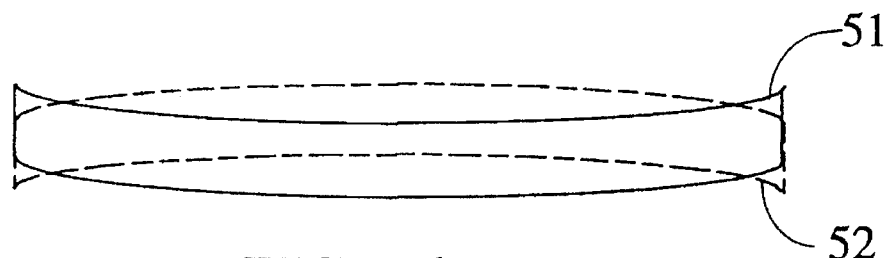

FIG. 16 are other image patterns by diffracted light or scattered light by the fourth, sixth, seventh embodiments of the present invention and the conventional image pickup apparatus. The numeral 50 in FIG. 16A denotes a code reading pattern, the numeral 51 in FIG. 16B denotes an image pattern of plus side diffracted light or scattered light and the numeral 52 in FIG. 16B denotes a pattern of minus side diffracted light or scattered light.

The operation of the eighth embodiment of the present invention is explained below. If a pattern shown in FIG. 16A, for example, is picked up, the diffracted light or file scattered light transmits through the border portion of the image lens makes image patterns 51 or 52 shown in FIG. 16B. From the above reason, there arises a problem that an indistinct image such as a distorted image pattern or a blurred image pattern is generated.

The image pickup apparatus of eighth embodiment which solutes the problem described in FIG. 16 is explained below.

Figure 17:
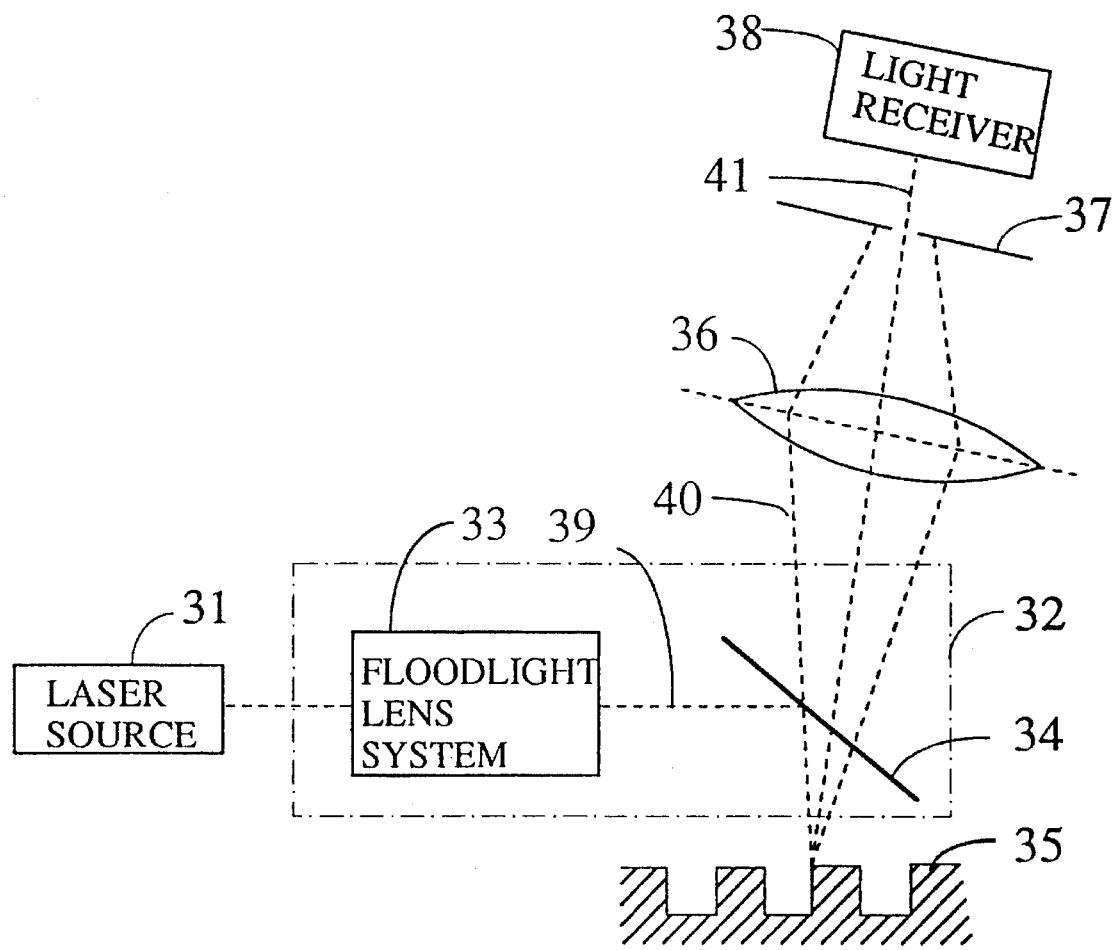
FIG. 17 is a block diagram which shows a construction of an image pickup apparatus other embodiments of the present invention.

FIG. 17 is a block diagram which shows a construction of an image pickup apparatus of other embodiments of the present invention. In FIG. 17, the numeral 31 denotes a laser light source, the numeral 32 a lighting optical system, the numeral 33 a floodlight lens system, the numeral 34 a half mirror, the numeral 35 a code reading pattern, the numeral 36 an image lens, the numeral 37 a spatial frequency filter which is placed at the back focal plane of the image lens 36, the numeral 38 a image sensor. The numeral 39 denotes a parallel light which is obtained by the light source 31 and floodlight lens system 33, the numeral 40 a regular reflected light from the pattern 35, the numeral 41 a plus nth order or minus nth order diffracted light (n=1, 2, 3, . . . ) reflected from the code reading pattern 35.

Figure 18:
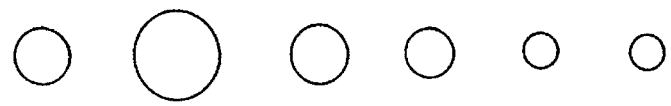
FIG. 18 is a diffracted light pattern from the reading code by another embodiment of the present invention.
Figure 19:
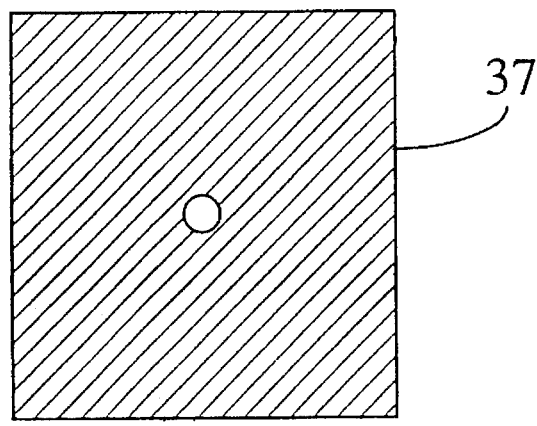
FIG. 19 is a spatial frequency filter of another embodiment of the present invention.
Figure 20:
FIG. 20 is a resultant image pattern of an image pickup apparatus of another embodiment of the present invention.

The operation of the eighth embodiment of the present invention is explained below. FIG. 18 is a diffracted light pattern from the code reading pattern by another embodiment of the present invention. FIG. 19 is a spatial frequency filter of a eighth embodiment of the present invention. FIG. 20 is a resultant image pattern by an image pickup apparatus of an eighth embodiment of the present invention.

In FIG. 17, the laser light radiated from the laser light source 31 is convened to a parallel light 39 by the floodlight lens system 33 and illuminates vertically the code reading pattern 35 which is constituted by the repetition shape having constant pitch using the half mirror 34. The repetition shape having constant pitch in the code reading pattern 35 is, for example, a one directional shape constructed with line and space as shown in FIG. 1A. A regular reflected light 40 having strong light intensity, a diffracted light 41 and a scattered light are reflected from the code reading pattern 35. The reflected light is converged by the image lens 36 which is equipped vertically or near vertically along the plus nth order or minus nth order diffracted light (n=1, 2, 3, . . . ) on the optical path or near the optical path.

Let's assume that the wave length of laser light is $\lambda$, the focal distance of the image lens 36 is f, the constant pitch width of the code reading pattern 35 is p and $80 \ll p$. Then, the regular reflected light 40 having strong light intensity and the diffraction pattern of the diffracted light 41 appear toward the repetition direction of the code reading pattern 35 by the rate of $\lambda \times f/p$ at the back focal plane of the image lens 36.

Concretely, in case that the pattern is constituted by one directional repetition shape of line and space, one directional diffraction pattern appears as shown in FIG. 18.

It is obvious that the spot made by the regular reflected light deviates from the center portion as shown in FIG. 18. A spatial frequency filter 37 is equipped at the back focal plane of the image lens 36 for transmitting only the diffracted light 41 which comes vertically or near vertically into the center portion or near the center portion of the image lens 36. One example of the concrete shape of the spatial frequency filter 37 is shown in FIG. 19, which has an aperture in the center of the filter.

The spatial frequency filter 37 suppresses a regular reflected light having strong light intensity, a scattered light which is the origin of the noise and a diffracted light other than the diffracted light coming vertically or near vertically into the center portion or near the center portion of the image lens 36. The diffracted light 40 transmitted through the spatial frequency filter 37 forms an image of the symbol which is received by the image sensor 38 in order to make the pickup picture.

According to the eighth embodiment, since the pattern is imaged by only one diffracted light, blur of pattern image and intensity irregularity of the image according to the generation of the interference fringe can be reduced. Further, since the diffracted light comes vertically or near vertically into the center portion or near the center portion of the image lens, the aberration of optical lens is suppressed.

When the code reading pattern 50 of FIG. 16A is picked up by the image pickup apparatus of the fourth embodiment, a clear image 53 with less blur and distortion is obtained as shown in FIG. 20. Further, only one side of diffracted light of nth order is converged, the image lens becomes small and the equipment is miniaturized.

As described above, according to the eighth embodiment, code recognition reliability improves. And since the noise measures can be reduced, both H/W, S/W can be simplified, and since less pre-processing is needed, the recognition process can be speeded up and a cheap recognition system can be obtained. Further, only one side of diffracted light of nth order is converged, the image lens becomes small and the equipment is miniaturized.

Let's assume that the wave length of laser light is $\lambda$, the constant pitch width of the code reading pattern is p, the focal distance of the image lens is f, the spatial frequency filter is constructed by the transmission portion which is equipped at the distance of $n \times \lambda \times f/p$ (n=1, 2, 3, . . . ) away from the center of the light axis for transmitting only the diffracted light and the interception portion for intercepting the reflection light other than the diffraction light. Especially, if the light transmitting portion of the above spatial frequency filter is constructed by apertures, the manufacturing process is simplified and the cost becomes cheap. When the diffracted light transmits through the spatial frequency filter, since the diffracted light does not transmit through the medium except the ambient atmosphere where the image pickup apparatus is placed, the diffracted light can transmit without disturbance.

Embodiment 9

Figure 21:
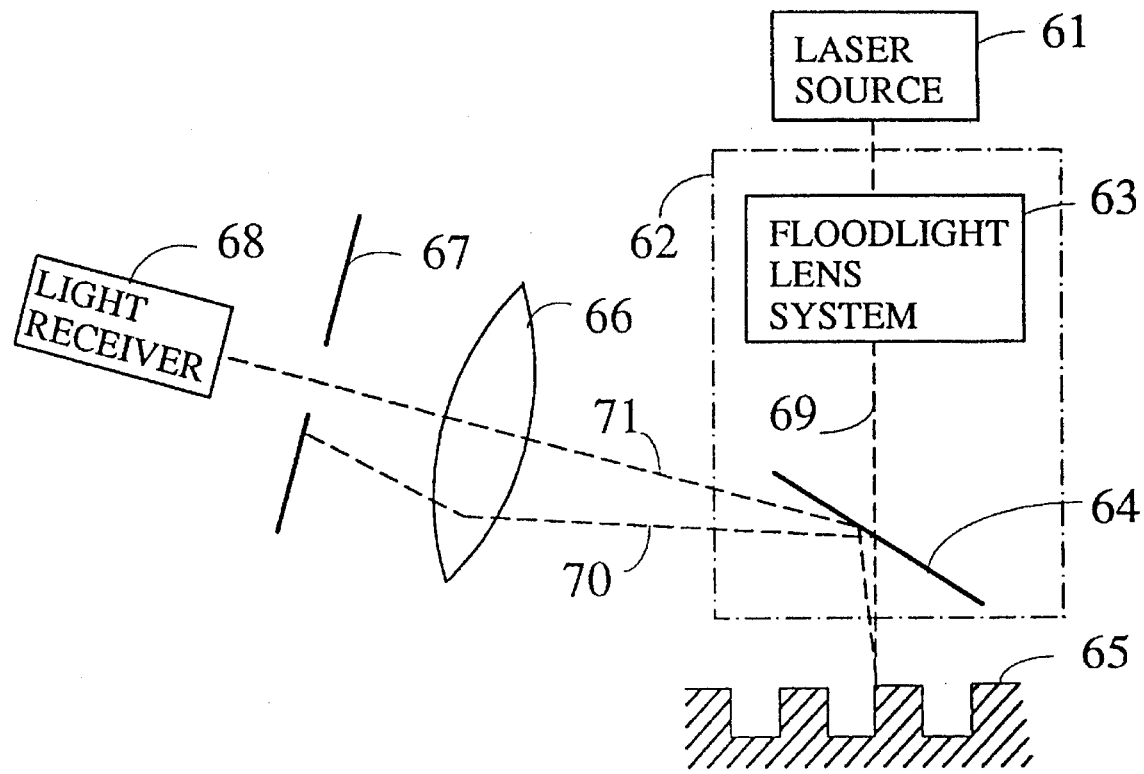
FIG. 21 is another block diagram which shows an image pickup apparatus of other embodiments of the present invention.

FIG. 21 is another block diagram which shows an image pickup apparatus other embodiments of the present invention. In FIG. 21, the numeral 61 denotes a laser light source, the numeral 62 a lighting optical system, the numeral 63 a floodlight lens' system, the numeral 64 a half mirror, the numeral 65 a code reading pattern, the numeral 66 an image lens, the numeral 67 a spatial frequency filter which is placed at the back focal plane of the image lens 66, the numeral 68 a image sensor. The numeral 69 denotes a incident light, the numeral 70 a diffracted light, the numeral 71 a regular reflected light.

The operation of the ninth embodiment of the present invention is explained below. In the image pickup apparatus shown in FIG. 21, the lighting optical system except the half mirror 34 in the image pickup apparatus ( FIG. 17) in the above eighth embodiment is interchanged with the image sensing means including the image lens 36, the spatial frequency filter 37 and the image sensor 38. As a result, the parallel incident light transmits half mirror 64, the regular reflected light 70 from the code reading pattern 65 and the diffracted light 71 reflect by the half mirror 64 and image on the focal plane by the image lens 66.

The spatial frequency filter 67 which is placed at the back the focal plane of image lens 66 suppresses the regular reflected light 70 having strong light intensity and the scattered light which is the origin of the noise and the diffracted light other than diffracted light coming vertically or near vertically into the center portion or near the center portion of the image lens 66, and transmits only a diffracted light 71 coming vertically or near vertically into the center portion or near the center portion of the image lens 66. The diffracted light transmitted through the spatial frequency filter 67 forms an image of the symbol which is received by the image sensor 68 in order to make the pickup picture.

According to the present embodiment, the spatial frequency filter 67 is equipped with only one aperture, but if influence of the pickup picture is negligible extent, a plurality of diffracted light may be transmitted through the spatial filter as shown in FIG. 8. In that case, the span of the aperture is $n \times \lambda \times f/p$ (n=1, 2, 3, . . . ), but the regular reflected light has to be prevented from transmitting.

Embodiment 10

According to the above respective embodiment, a laser light source is used as the light source, but only one specified wave length light may be selected among the multi wave length light source as a light source of the image pickup apparatus. And also coherent light may be used as a light source.

Embodiment 11

According to the above respective embodiment, the lighting optical system illuminates the pattern from vertical direction, but it may illuminate from an oblique direction. In this case, the image sensing means is equipped on the plus nth order diffraction light axis or minus nth order diffraction light axis (n=1, 2, 3, . . . ) or near the diffraction light axis as same as those of eighth or ninth embodiments.

Embodiment 12

According to the above respective embodiment, the diffracted light used for image is only one diffracted light, but if influence of the pickup picture is negligible extent, a plurality of diffracted light which comes vertically or near vertically into the center portion or near the center portion of the image lens may be used for imaging a pattern.

Embodiment 13

According to the above respective embodiment, transmitting portion of spatial frequency filter consists of aperture, but intercepting portion of the spatial frequency filter may be formed by means such as vapor deposition, applying and exposure on the transparent object.

Embodiment 14

According to the above respective embodiment, the spatial frequency filter may be a liquid crystal board which consist of many small areas. In that case, the transmission portion and the interception portion is consisted by changing electrically the molecular arrangement direction of the liquid crystal for each area. Therefore, there is no need to change the spatial frequency filter when the transmission path is changed. That is, if the diffracted light which is used for the code are to be changed, it is easy to change the light transmission portion without changing the spatial frequency filter.

Figure 22:
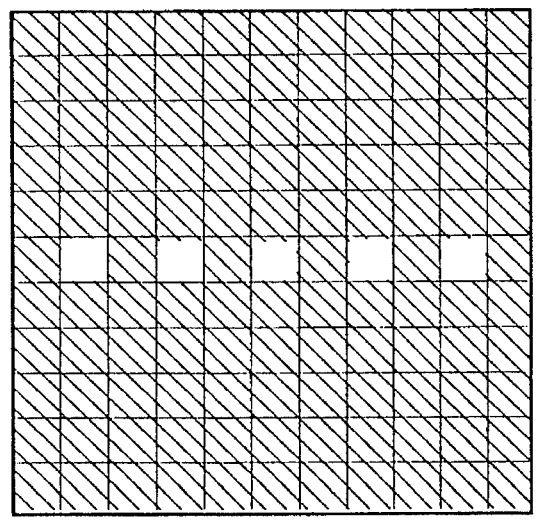
FIG. 22 is an example of a liquid crystal board of an embodiment of the present invention.

FIG. 22 is an example of a liquid crystal board of an embodiment of the present invention.

Embodiment 15

According to the above respective embodiment, the light other than the diffracted light used for imaging is intercepted by the spatial frequency filter, but if influence of the pickup picture is negligible extent, the light other than the diffracted light used for imaging may be attenuated in the spatial frequency filter for picking up a code.

Embodiment 16

According to the above respective embodiment, only diffracted light which is reflected from the code reading pattern is received for imaging a code, but a diffracted light which is transmitted through the code reading pattern may be received for imaging a code for obtaining a similar effect.

Those skilled in the art will recognize which many modifications to the foregoing description can be made without departing from the spirit of the invention. The foregoing description is intended to be exemplary and in no way limiting. The scope of the invention is defined in the appended claims and equivalents thereto.

What is claimed is:

1. An image pickup apparatus for reading a code reading pattern, the code reading pattern having repeated markings of constant pitch, the markings formed on a surface of an object, the markings defining an area having at least one boundary, the at least one boundary defining an outline of a symbol, the symbol representing significant information, the apparatus comprising:

lighting means for illuminating the markings of the code reading pattern with parallel light to generate reflected light;

image means for directing the reflected light from the markings to various points along a near back focal plane of the image means, wherein diffracted light of one or more selected nth orders, wherein n is an integer, and from different markings is directed to the near back focal plane, the reflected light including regular reflected light and diffracted light;

transmission means, including a spatial frequency filtering system located at the near back focal plane of the image means, for transmitting the diffracted light of the one or more selected nth orders, and for blocking the regular reflected light, and for blocking the diffracted light of a non-selected nth order; and receiving means for receiving an image of the symbol formed by the diffracted light transmitted through the transmission means.

2. An image pickup apparatus according to claim 1, wherein the markings include indentations into the surface.

3. An image pickup apparatus according to claim 1, wherein the code reading pattern includes a plurality of kinds of constant pitches.

4. An image pickup apparatus according to claim 1, wherein the markings include indentations into the surface and wherein the code reading pattern includes a plurality of kinds of constant pitches.

5. An image pickup apparatus according to claim 1, wherein the code reading pattern includes two sets of repeated markings of constant pitch, the pitch of one set being different than the pitch of the other set, and wherein the spatial frequency filtering system includes means for transmitting diffracted light from both sets.

6. An image pickup apparatus for reading a code reading pattern, the code reading pattern having repeated markings of constant pitch, the markings formed on a surface of an object, the markings defining an area having at least one boundary, the at least one boundary defining an outline of a symbol, the symbol representing significant information, the apparatus comprising:

lighting means for illuminating the markings of the code reading pattern with parallel light to generate reflected light;

an image lens aligned with respect to the surface of the object and the lighting means so as to direct the reflected light from the markings to various points along a near back focal plane of the image lens, wherein diffracted light of one or more selected nth orders, wherein n is an integer, and from different markings is directed to the near back focal plane, the reflected light including regular reflected light and diffracted light;

transmission means, including a spatial frequency filtering system, located at the near back focal plane of the image lens, for transmitting the diffracted light the one or more selected nth orders, and for blocking regular reflected light, and for blocking the diffracted light of a non-selected nth order; and receiving means for receiving an image of the symbol formed by the diffracted light transmitted through the transmission means.

7. An image pickup apparatus according to claim 6, wherein the markings include indentations into the surface.

8. An image pickup apparatus for reading a code reading pattern, the code reading pattern having repeated markings of constant pitch, the markings formed on a surface of an object, the markings defining an area having at least one boundary, the at least one boundary defining an outline of a symbol, the symbol representing significant information, the apparatus comprising:

lighting means for illuminating the markings of the code reading pattern with parallel light to generate reflected light;

image means for directing the reflected light from the markings to various points along a near back focal plane of the image means, wherein diffracted light of one or more selected nth orders, wherein n is an integer, and from different markings is directed to the near back focal plane, the reflected light including regular reflected light and diffracted light a spatial frequency filter having an aperture at a distance of $|n| \times \lambda \times f/p$, wherein n is an integer, away from the center of the light axis, where the wavelength of the parallel light is $\lambda$, the constant pitch width of the code reading pattern is p, the focal distance of the image means is f, for transmitting the diffracted light of the one or more selected nth orders through the aperture, and for blocking regular reflected light, and for blocking the diffracted light of a non-selected nth order; and receiving means for receiving an image of the symbol formed by the diffracted light transmitted through the spatial frequency filter.

9. An image pickup apparatus according to claim 8, wherein the code reading pattern includes indentations into the surface.

10. A code member, for use with an image pickup apparatus, the image pickup apparatus having a lighting source to illuminate the code member with parallel light having a wavelength to generate reflected light, an image lens to direct to a back focal plane a selected nth order of diffracted light from the reflected light, wherein n is an integer, wherein the back focal plane is a focal distance from the code member, wherein diffracted light of one or more selected nth orders and from different markings is directed to the near back focal plane, and a spatial frequency filter having apertures spaced apart at a spaced-apart distance, the code member comprising repeated markings of constant pitch width, the markings defining an area having at least one boundary, the at least one boundary defining a closed outline of an entire symbol, wherein the pitch width is determined according to a function of the wavelength, the focal distance, and the spaced-apart distance.

11. A code member according to claim 10, wherein the pitch width is $|n| \times \lambda \times f/d$, where n is an integer, $\lambda$ is the wavelength of laser light, f is the focal distance of the image lens, and d is the spaced-apart distance.

12. An image pickup apparatus for reading a code reading pattern, the code reading pattern having repeated markings of constant pitch, the markings formed on a surface of an object, the markings defining an area having at least one boundary, the at least one boundary defining an outline of a symbol, the symbol representing significant information, the apparatus comprising:

lighting means for illuminating the markings of the code reading pattern with parallel light to generate reflected light;

image means for directing the reflected light from the markings to various points along a near back focal plane of the image means, the reflected light including regular reflected light and diffracted light;

transmission means, including a spatial frequency filtering system located at the near back focal plane of the image means, for transmitting the diffracted light of one or more selected nth orders, wherein n is an integer, and for blocking the regular reflected light, and for blocking the diffracted light of a non-selected nth order;

receiving means for receiving an image of the symbol formed by the diffracted light transmitted through the transmission means; and wherein the code reading pattern includes two sets of repeated markings of constant pitch, the markings of one set transverse to the markings of the other set, and wherein the spatial frequency filtering system includes means for transmitting diffracted light from both sets.

13. An optical system for reading a symbol representing significant information, comprising:

a code member having a code reading pattern, the code reading pattern having repeated markings of constant pitch, the markings formed on a surface of the code member, the markings defining an area having at least one boundary, the at least one boundary defining an outline of the symbol;

lighting means for illuminating the markings of the code reading pattern with parallel light to generate reflected light;

image means for directing the reflected light from the markings to various points along a near back focal plane of the image means, wherein diffracted light of one or more selected nth orders, wherein n is an integer, and from different markings is directed to the near back focal plane, the reflected light including regular reflected light and diffracted light;

transmission means, including a spatial frequency filtering system located at the near back focal plane of the image means, for transmitting the diffracted light of the one or more selected nth orders, and for blocking the regular reflected light, and for blocking the diffracted light of a non-selected nth order; and receiving means for receiving an image of the symbol formed by the diffracted light transmitted through the transmission means.

14. An optical system according to claim 13, wherein the code reading pattern includes two sets of repeated markings of constant pitch, the pitch of one set being different than the pitch of the other set, and wherein the spatial frequency filtering system includes means for transmitting diffracted light from both sets.

15. An optical system for reading a symbol representing significant information, comprising:

a code member having a code reading pattern, the code reading pattern having repeated markings of constant pitch, the markings formed on a surface of the code member, the markings defining an area having at least one boundary, the at least one boundary defining an outline of the symbol;

lighting means for illuminating the markings of the code reading pattern with parallel light to generate reflected light;

image means for directing the reflected light from the markings to various points along a near back focal plane of the image means, the reflected light including regular reflected light and diffracted light;

transmission means, including a spatial frequency filtering system located at the near back focal plane of the image means, for transmitting the diffracted light of one or more selected nth orders, wherein n is an integer, and for blocking the regular reflected light, and for blocking the diffracted light of a non-selected nth order;

receiving means for receiving an image of the symbol formed by the diffracted light transmitted through the transmission means; and wherein the code reading pattern includes two sets of repeated markings of constant pitch, the markings of one set transverse to the markings of the other set, and wherein the spatial frequency filtering system includes means for transmitting diffracted light from both sets.

16. A method for reading a symbol stored on a surface of an object, comprising the steps of:

forming a pattern of repeated markings of constant pitch on the surface, the markings defining an area having at least one boundary, the at least one boundary defining an outline of a symbol, the symbol representing significant information;

illuminating the markings with light to produce reflected light, the reflected light including regular reflected light and diffracted light;

focusing the reflected light onto a focal plane wherein diffracted light of one or more selected nth orders, wherein n is an integer, and from different markings is directed to the focal plane;

filtering the reflected light through a spatial frequency filter to block the regular reflected light, to transmit the diffracted light of the one or more selected nth orders, and to block the diffracted light of a non-selected nth order, the selected diffracted light forming an image of the symbol; and receiving the image of the symbol.

17. An image pickup apparatus for reading a code reading pattern, the code reading pattern having repeated markings of constant pitch, the markings formed on the surface of an object, the markings defining an area having at least one boundary, the at least one boundary defining an outline of a symbol, the symbol representing significant information, the apparatus comprising:

lighting means for illuminating the code reading pattern with parallel light;

image means for imaging light reflected from the code reading pattern;

transmission means, including a spatial frequency filtering system located at the near back focal plane of the image means, for transmitting diffracted light of a selected mode, for blocking regular reflected light, and for blocking diffracted light of a non-selected mode; and receiving means for receiving an image of the symbol formed by the diffracted light transmitted through the transmission means, wherein the code reading pattern includes two sets of repeated markings of constant pitch, the markings of one set transverse to the markings of the other set, and wherein the spatial frequency filtering system includes means for transmitting diffracted light from both sets.

18. An optical system for reading a symbol representing significant information, comprising:

a code member having a code reading pattern, the code reading pattern having repeated markings of constant pitch, the markings formed on the surface of the code member, the markings defining an area having at least one boundary, the at least one boundary defining an outline of the symbol;

lighting means for illuminating the code reading pattern with parallel light;

image means for imaging light reflected from the code reading pattern;

transmission means, including a spatial frequency filtering system located at the near back focal plane of the image means, for transmitting diffracted light of a selected mode, and for blocking regular reflected light; and receiving means for receiving an image of the symbol formed by the diffracted light transmitted through the transmission means, wherein the code reading pattern includes two sets of repeated markings of constant pitch, the markings of one set transverse to the markings of the other set, and wherein the spatial frequency filtering system includes means for transmitting diffracted light from both sets.

* * * * *

UNITED STATES PATENT AND TRADEMARK OFFICE

CERTIFICATE OF CORRECTION

PATENT NO. :  5,481,095

DATED      :  January 2, 1996

INVENTOR(S):  Hiroshi Mitsuda, Masahiko Sakamoto, Hitoshi Tanaka, Nobuyuki Kosaka and Yoshinori Ito It is certified that error appears in the above-identified patent and that said Letters Patent is hereby corrected as shown below:

Column 13, line 45, change "40" to -- 41 --.
Column 14, line 29 change "diffracted" to -- regular reflected --; line 30 change "regular reflected" to -- diffracted --.

Signed and Sealed this

Twenty-second Day of October, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,481,095

DATED : January 2, 1996

INVENTOR(S) : Hiroshi Mitsuda, et al

It is certified that error appears in the above-identified patent and that said Letters Patent is hereby corrected as shown below:

The title page, showing the illustrative Figure should be deleted to be replaced with the attached title page.

In the drawings, Figure 6, should be deleted to be replaced with the corrected Figure 6, as shown on the attached page.

Signed and Sealed this

Twenty-sixth Day of November 1996

Attest:

BRUCE LEHMAN

Attesting Officer

Commissioner of Patents and Trademarks

United States Patent [19]
Mitsuda et al.

[11] Patent Number: 5,481,095
[45] Date of Patent: Jan. 2, 1996

[54] CODE READING PATTERN AND AN IMAGE PICKUP APPARATUS FOR READING THE PATTERN

[75] Inventors: Hiroshi Mitsuda; Masahiko Sakamoto; Hitoshi Tanaka; Nobuyuki Kosaka; Yoshinori Ito, all of Hyogo, Japan

[73] Assignee: Mitsubishi Denki Kabushiki Kaisha, Tokyo, Japan

[21] Appl. No.: 293,741

[22] Filed: Aug. 22, 1994

Related U.S. Application Data

[63] Continuation of Ser. No. 17,738, Feb. 16, 1993, abandoned.

[30] Foreign Application Priority Data

| Feb. 17, 1992 | [JP] | Japan | 4-029582 |
| Oct. 15, 1992 | [JP] | Japan | 4-276871 |
| Jan. 13, 1993 | [JP] | Japan | 5-019483 |

[51] Int. Cl.⁶ ............................................. G06K 7/10
[52] U.S. Cl. ........................... 235/454; 235/457; 235/494
[58] Field of Search .............................. 235/454, 462, 235/467, 472, 457, 494; 250/237 G, 208.6; 359/2, 3, 17, 558, 562, 563, 566, 568, 572; 283/904, 91, 85, 86; 356/71

[56] References Cited

U.S. PATENT DOCUMENTS

| 3,572,900 | 3/1971 | Bouche | 350/162 SF |
| 4,501,439 | 2/1985 | Antes | 283/904 X |
| 4,511,616 | 4/1985 | Pitts et al. | 283/904 X |
| 4,568,141 | 2/1986 | Antes | 359/2 |
| 4,956,553 | 9/1990 | Matsui | 250/237 G |
| 4,984,824 | 1/1991 | Antes | 283/91 |
| 5,059,776 | 10/1991 | Antes | 235/457 |
| 5,073,710 | 12/1991 | Takagi et al. | 250/237 G |
| 5,101,184 | 3/1992 | Antes | 235/457 |
| 5,138,604 | 8/1992 | Umeda | 235/457 |
| 5,182,610 | 1/1993 | Shibata | 250/237 G |
| 5,251,937 | 10/1993 | Ojster | 283/91 |
| 5,291,006 | 3/1994 | Nishiguma et al. | 235/454 |

FOREIGN PATENT DOCUMENTS

| 2814890 | 12/1978 | Germany | 235/457 |
| 61-131438 | 6/1986 | Japan. | |
| 2-198128 | 8/1990 | Japan. | |

*Primary Examiner*—Donald T. Hajec
*Assistant Examiner*—Karl D. Frech
*Attorney, Agent, or Firm*—Wolf, Greenfield & Sacks

[57] ABSTRACT

A code reading pattern and an image pickup apparatus are provided for reading a symbol representing significant information, the symbol encoded by the pattern. The code reading pattern is formed by repeated markings of constant pitch on the surface of an object. The markings define area having at least one boundary, the at least one boundary defining an outline of the symbol. The apparatus includes a lighting system for illuminating the code reading pattern with parallel light, an imaging system for imaging light reflected from the pattern, a spatial frequency filtering system, located at the near back focal plane of the imaging system, for blocking regular reflected light and for transmitting diffracted light to project an image of the symbol, and a receiver for receiving the image.

18 Claims, 15 Drawing Sheets

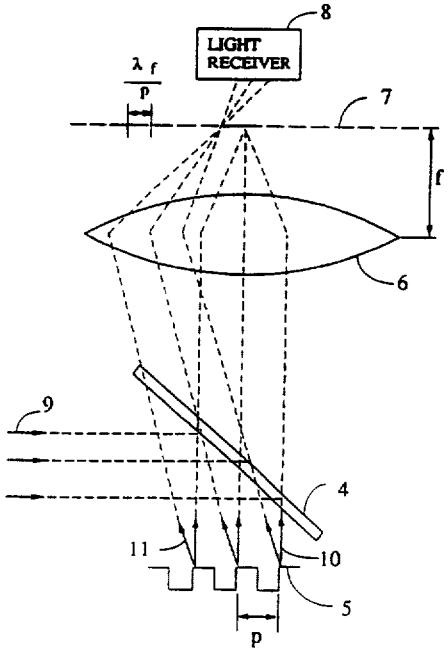

UNITED STATES PATENT AND TRADEMARK OFFICE
CERTIFICATE OF CORRECTION

PATENT NO. : 5,481,095

Page 1 of 2

DATED : January 2, 1996

INVENTOR(S) : Hiroshi Mitsuda et al

Figure 23:
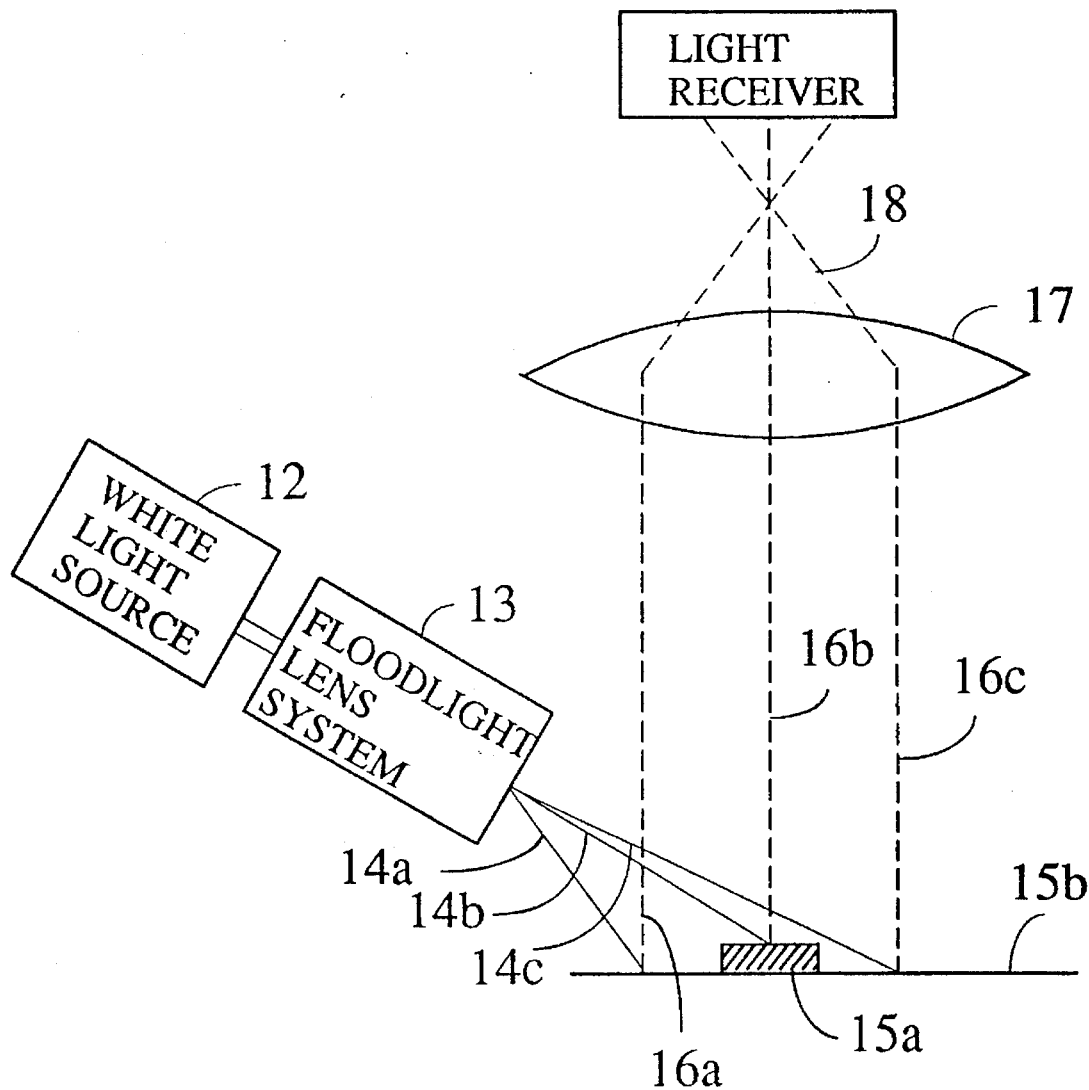
FIG. 23 is a block diagram which shows a construction of a conventional image pickup apparatus which picks up the code.
Figure 6:
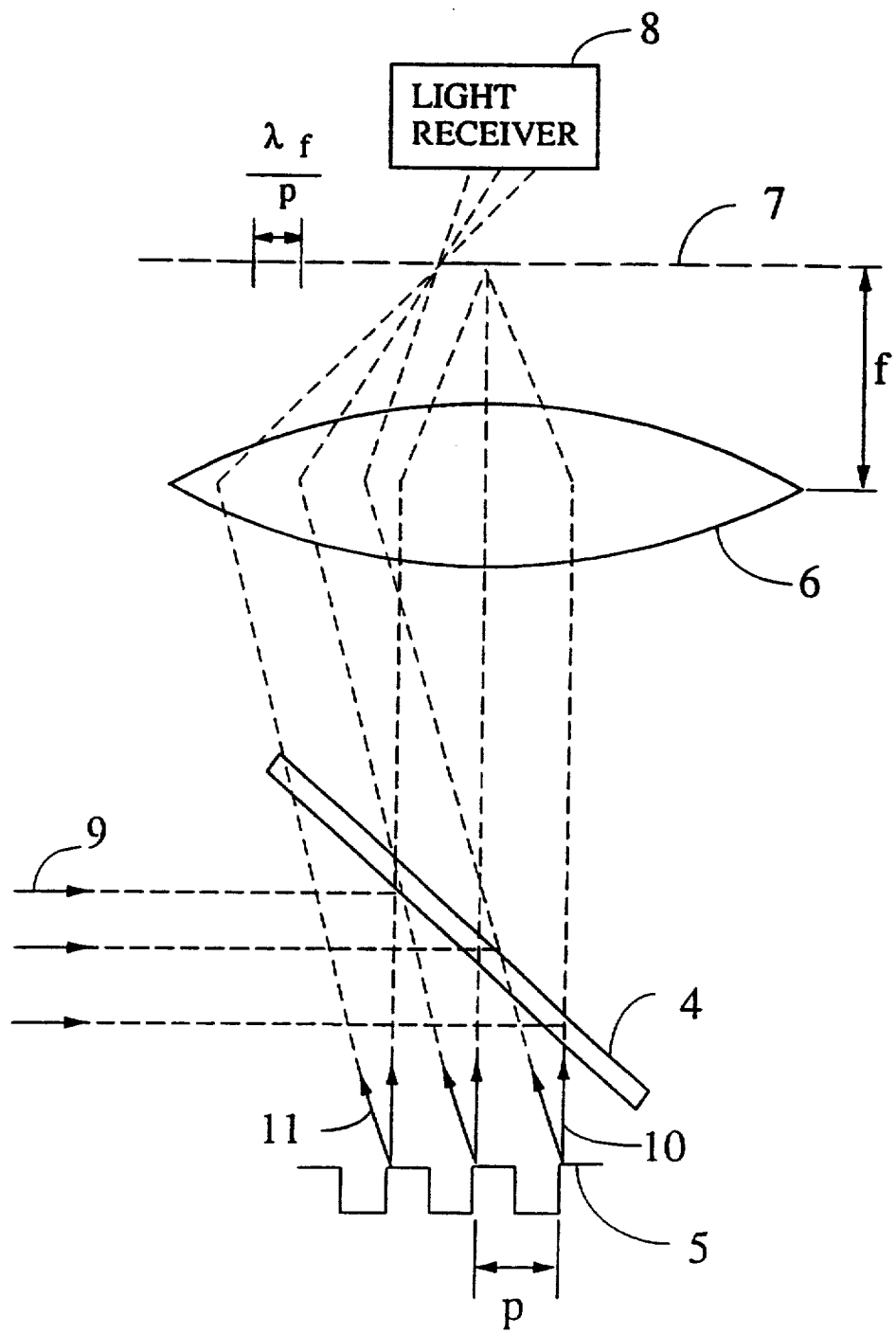

It is certified that error appears in the above-identified patent and that said Letters Patent is hereby corrected as shown below:

In the drawings, Figure 23 should be deleted to be replaced with the corrected Figure 23 as shown on the attached page.

Signed and Sealed this

Eighteenth Day of March, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,481,095
DATED : January 2, 1996
INVENTOR(S) : Hiroshi Mitsuda, Masahiko Sakamoto, Hitoshi Tanaka, Nobuyuki Kosaka and Yoshinori Ito It is certified that error appears in the above-indentified patent and that said Letters Patent is hereby corrected as shown below:

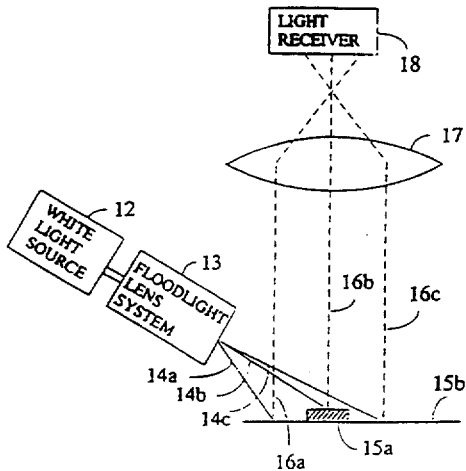

FIG. 23
(PRIOR ART)